United States Patent [19]

Watkins

[11] 4,067,651
[45] Jan. 10, 1978

[54] METHOD FOR MEASURING THE PARAMETERS OF OPTICAL FIBERS

[75] Inventor: Laurence Shrapnell Watkins, Hopewell Township, Mercer County, N.J.

[73] Assignee: Western Electric Company, Inc., New York, N.Y.

[21] Appl. No.: 702,833

[22] Filed: July 6, 1976

Related U.S. Application Data

[62] Division of Ser. No. 482,707, June 21, 1974, Pat. No. 3,982,816.

[51] Int. Cl.² .................. G01N 21/00; G01B 9/02; G01B 11/04
[52] U.S. Cl. .................. 356/103; 356/111; 356/159; 250/550
[58] Field of Search .................. 356/103, 111, 159; 250/550, 574

[56] References Cited

U.S. PATENT DOCUMENTS

| | | | |
|---|---|---|---|
| 3,624,835 | 11/1971 | Wyatt | 356/103 |
| 3,730,842 | 5/1973 | Wyatt et al. | 356/103 |

OTHER PUBLICATIONS

Kerker, M. and E. Matijevic, "Scattering of Electromagnetic Waves from Concentric Infinite Cylinders," JOSA, vol. 51, No. 5, 1961.

*Primary Examiner*—Conrad J. Clark
*Attorney, Agent, or Firm*—D. J. Kirk; B. W. Sheffield

[57] ABSTRACT

Parameters of a clad optical fiber are measured by irradiating the fiber with a laser beam to generate a scattering pattern. Measurements are made of fringes and modulations in the scattering pattern and these measurements are translated into such parameters as the diameter of the core and cladding thickness as well as the deviation from concentricity of the core of the clad optical fiber.

8 Claims, 29 Drawing Figures

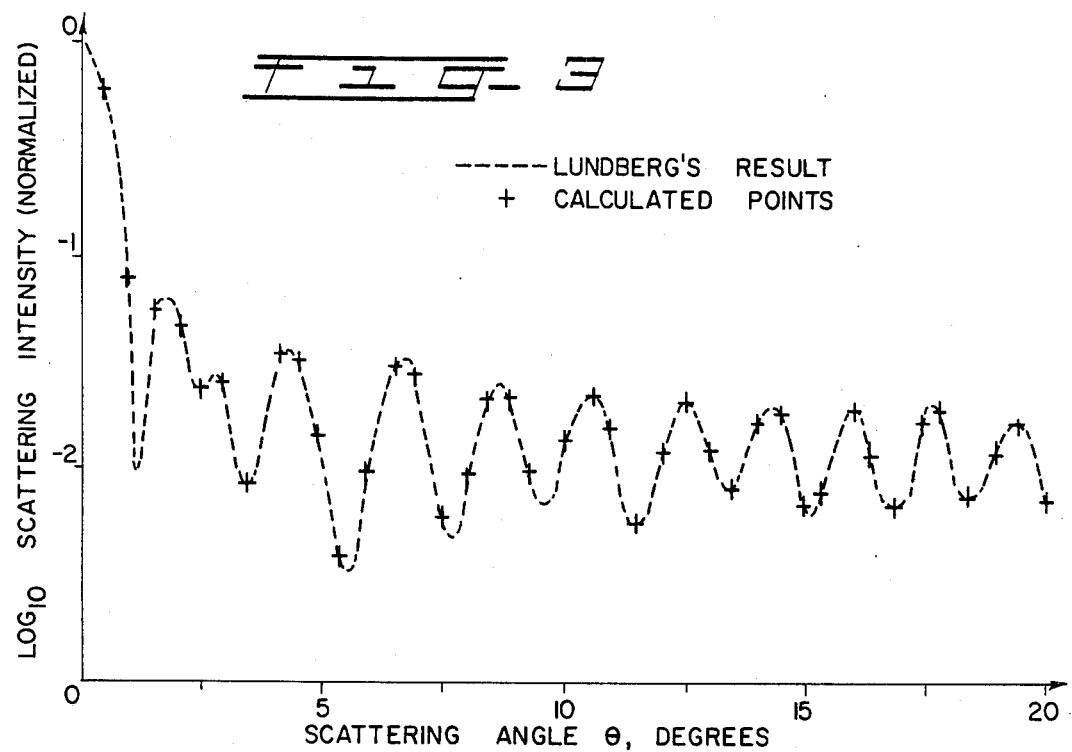
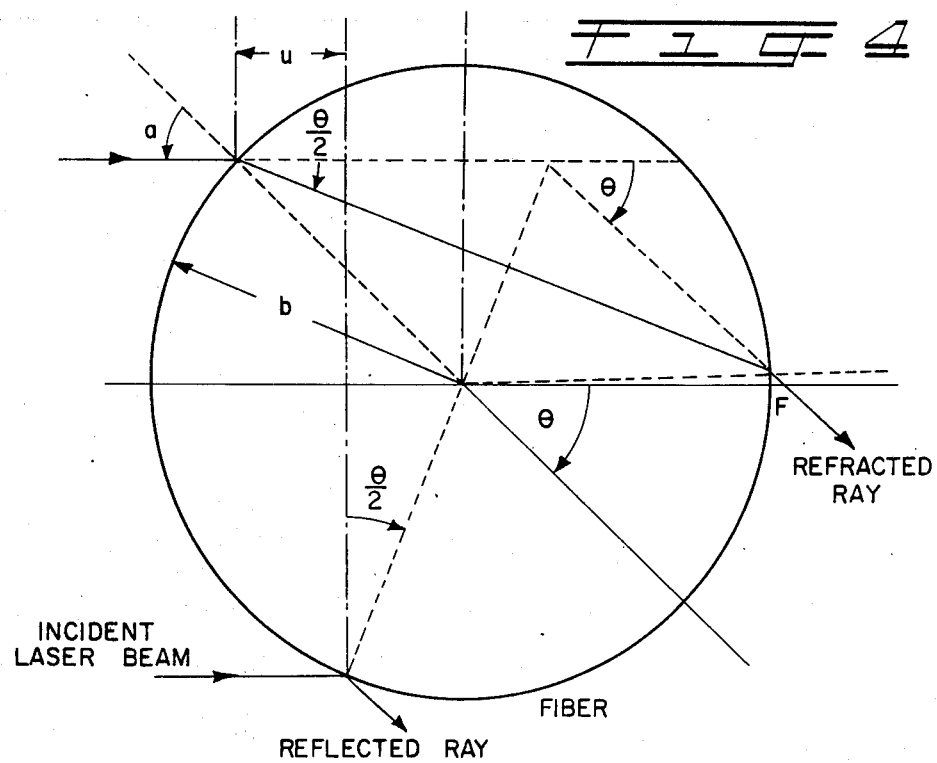

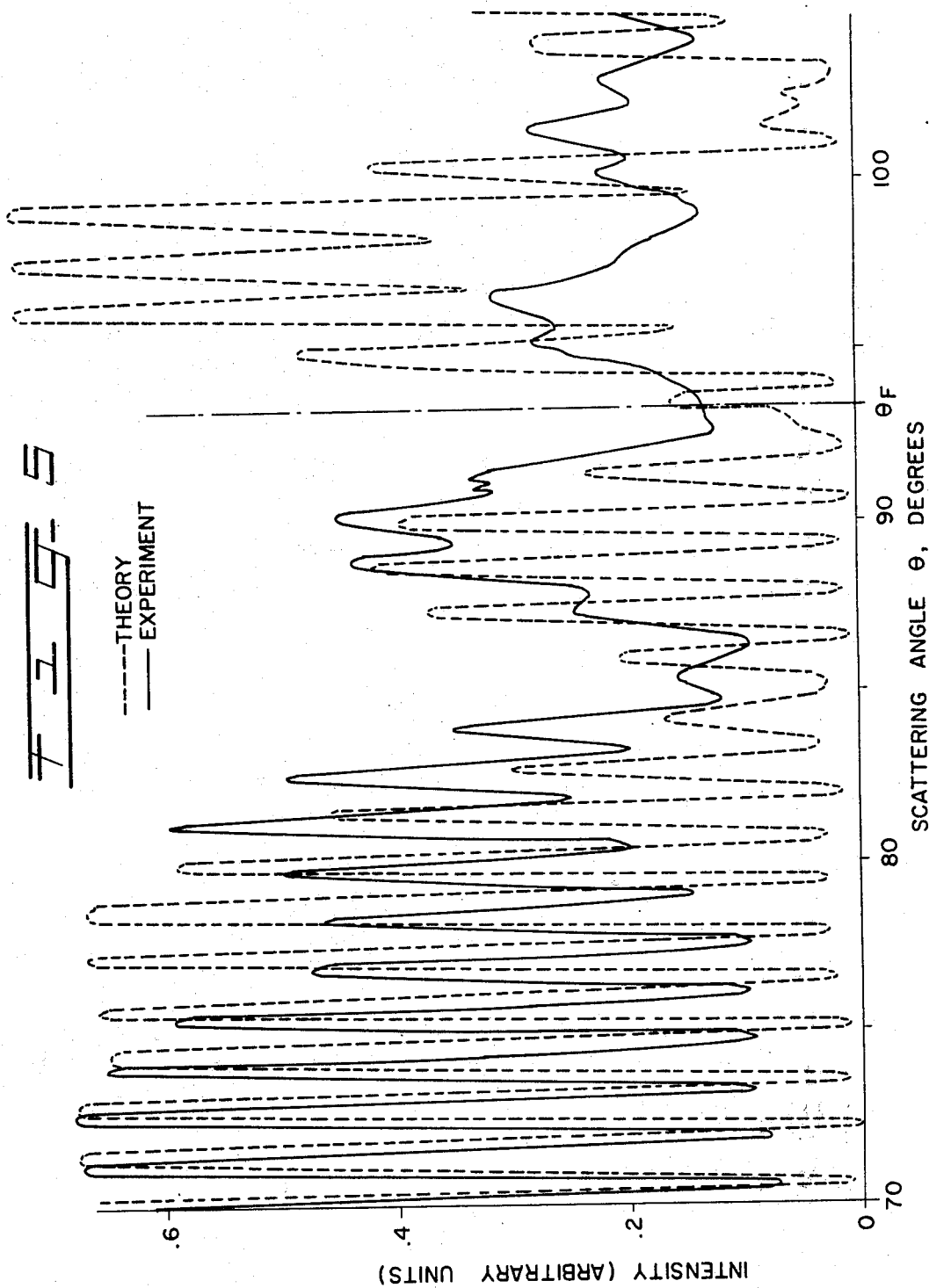

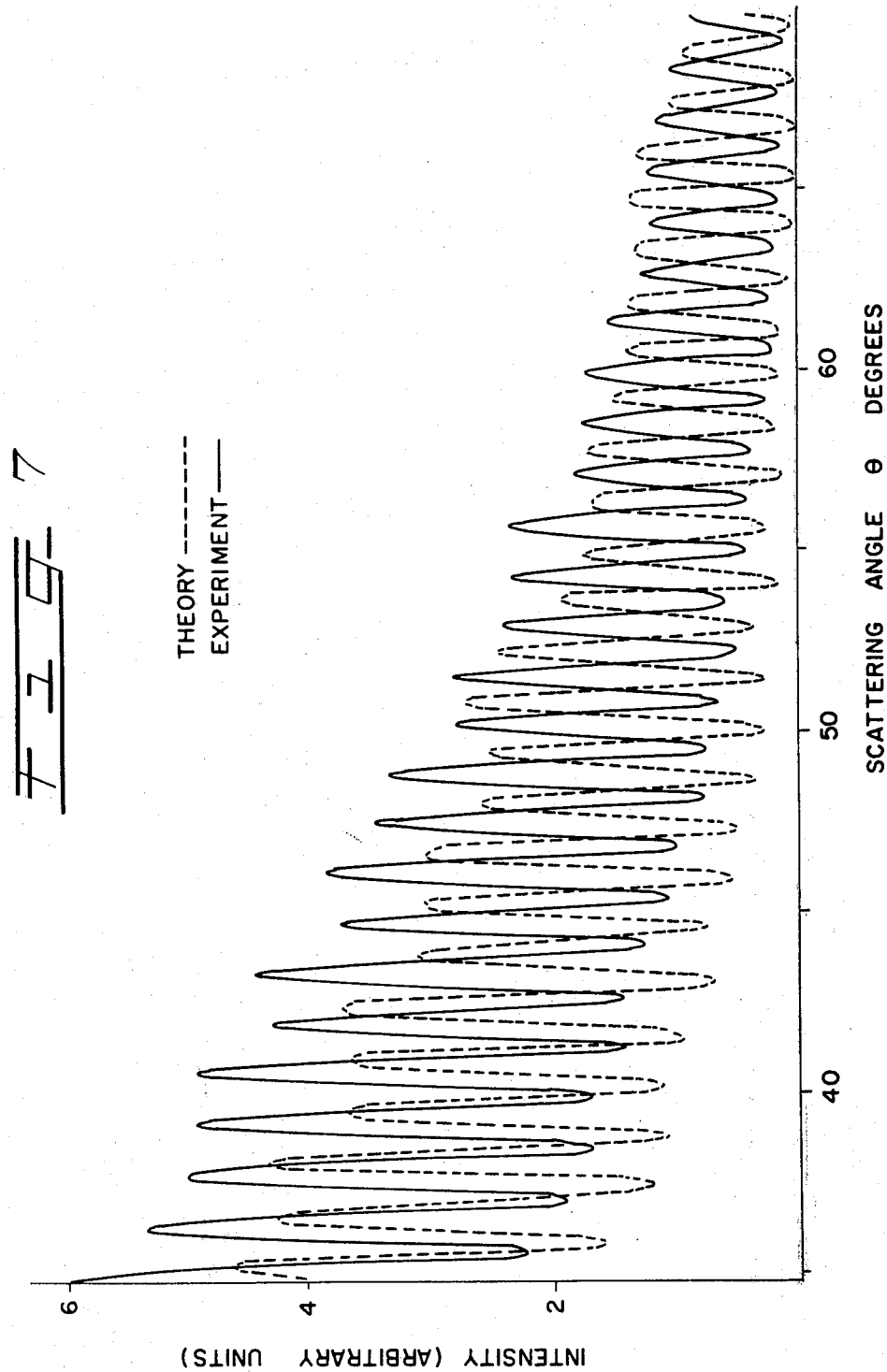

METHOD FOR MEASURING THE PARAMETERS OF OPTICAL FIBERS

This is a division, of application Ser. No. 482,707 filed June 21, 1974, now U.S. Pat. No. 3,982,816.

BACKGROUND OF THE INVENTION

1. Field of the Invention

Broadly speaking, this invention relates to methods for measuring the parameters of a filament. More particularly, this invention relates to methods for measuring properties of clad optical fibers, the like.

2. Discussion of the Prior Art

In the manufacture of high quality optical fibers, for example, for use in optical communication systems, it is virtually mandatory that such important fiber parameters as core diameter and circularity, cladding thickness, and core and cladding refractive index be continuously monitored during the manufacturing process. Also, because an optical fiber is relatively fragile, it is important that the methods employed to measure these parameters do not damage the fiber in any way.

It is, of course, well known to employ a laser beam to measure the diameter of a fine metal wire. See, for example, *Lasers in Industry*, S. S. Charschan, editor, Van Nonstrand Reinhold Co. (1973) page 393 et seq. As taught in that publication, a laser beam directed at the wire to be measured generates the far-field Fraunhofer diffraction pattern of the wire. By measuring the spacing between successive maxima and minima in the diffraction pattern, and knowing the wavelength of the laser beam, it is a relatively easy matter to compute the diameter of the wire.

U.S. Pat. No. 3,709,610, which issued on Jan. 9, 1973 in the name of Herman A. Kreugle, suggests that this known technique may also be applied to measure the diameter of transparent, thermo-plastic filaments, such as rayon, nylon and acetate yarn. In a gross sense, this is true, bearing in mind that such fibers are not truly transparent but are more properly described as translucent. Thus, while the diffraction pattern generated from such a filament is complex, including contributions to the pattern caused by internal refraction through the yarn, the end result is essentially the same diffraction pattern that would be generated by an opaque filament, albeit of reduced contrast. Indeed, the Kreugle patent discloses several techniques for successfully detecting this reduced contrast diffraction pattern, including the technique of dying the yarn to render it opaque. See also the article by W. A. Farone and M. Kerker in the *Journal of the Optical Society of America*, Vol. 56 (1966) page 481 et seq., and the article by J. L. Lundberg in *Journal of Colloid and Interface Science*, Vol. 29, No. 3 (March 1969) at page 565 et seq.

Unfortunately, the measurement techniques disclosed by Kreugle are totally unsuited for use on high quality optical fiber Firstly, because these fibers are designed for use in low-loss optical communication systems, they are far more transparent than the translucent yarns measured by Kreugle. Thus, the contribution that the internally refracted rays make to the overall Fraunhofer pattern is considerably greater and cannot be ignored. In addition, reflection from the filament becomes increasingly significant and also cannot be ignored. Because of this, Kreugle's basic assumption, that the complex diffraction pattern generated by a translucent yarn can be treated as if it were an ordinary diffraction pattern, is incorrect when applied to the measurement of an optical fiber. Secondly, measurement of the diffraction pattern, even if it could be resolved, would not be accurate enough since the optical fiber is at least one order of magnitude smaller in diameter. Finally, and perhaps most important of all, an optical fiber typically comprises an inner core of a first refractive index and a thin outer cladding of a different refractive index. The measurement techniques disclosed by Kreugle, even if they could be applied to fiber optics, are incapable of measuring the thickness of the cladding layer and the core, or the relative refractive indices thereof, and at best, could merely measure the gross, overall diameter of the clad cable.

It is, however, known that a portion of a scattering pattern generated by a laser beam impinging on a transparent fiber can be used for measuring the diameter of the fiber. In this portion of the scattering pattern, interference between light reflected from the fiber and light refracted by the fiber causes fringes to appear. The distance between minima of the fringes is related to the diameter of the fiber. See "Interference Phenomena on Thin, Transparent Glass Filaments under Coherent Lighting," by Von Josef Gebhart and Siegfried Schmidt, *Zeitschrift fur angewandte Physik*, XIX. Band, Heft 2-1965.

The latter method, however, does not extend to clad fibers. It is desired to measure the diameter of the core and cladding thickness as well as the deviation for concentricity of the core of the clad fiber.

SUMMARY OF THE INVENTION

The instant method solves the foregoing problem with a method of measuring the diameter of a core of a clad optical fiber. Given the refractive indices of the cladding and core, $m_1$ and $m_2$, respectively, and the thickness of the cladding layer, applicant determines the diameter $D_C$ of the core of the optical fiber by directing a beam of spatially coherent, monochromatic radiation at the fiber to generate a complex scattering pattern, at least a portion of the pattern including contributions from the diffraction, the reflection and the refraction of the beam by the fiber. The scattering pattern is spatially radially disposed about the fiber and has a fringe pattern intensity modulation superimposed thereon. At a given angle $\theta_R$, the angular position of the modulation over an angle range $\Delta\theta_R$ is measured, where $\theta_R$ satisfies the relationship:

$$\theta_R + 0.5 \Delta\theta_R < \theta_F$$

and $\theta_F$ is the cut-off angle which satisfies the relation:

$$m_1 \cos \theta_F/2 = 1.$$

The core-to-fiber diameter ratio, R, is then determined by comparing the measured position with modulation positions priorly observed for clad optical fibers of the same core and cladding indices, measured at the same scattering angle. The core diameter $D_C$ is then computed from the equation:

$$D_C = 2Rt/(1 - R).$$

Additionally, methods for measuring the cladding thickness and the deviation from concentricity of the core of the clad optical fiber, as well as a method of measuring the degree of non-circularity of a transparent filament are disclosed.

These and other aspects of the invention will become apparent from the accompanying drawings and detailed description.

DESCRIPTION OF THE DRAWINGS

FIG. 3 is a graph which compares the predicted results of Lundberg with the core index equal to the cladding index, i.e., for an unclad fiber;

FIG. 4 is a cross-sectional view of unclad fiber which is useful in deriving mathematical relations used herein;

FIG. 5 is a graph which compares the actual and predicted scattering patterns of the fiber over a selected angle range for polarization parallel to the fiber;

FIG. 7 is a graph similar to that shown in FIG. 5 but for another angle range;

FIG. 16 is a graph showing the number of fringes present in the scattering pattern as a function of angle;

DETAILED DESCRIPTION OF THE INVENTION

Figure 1:
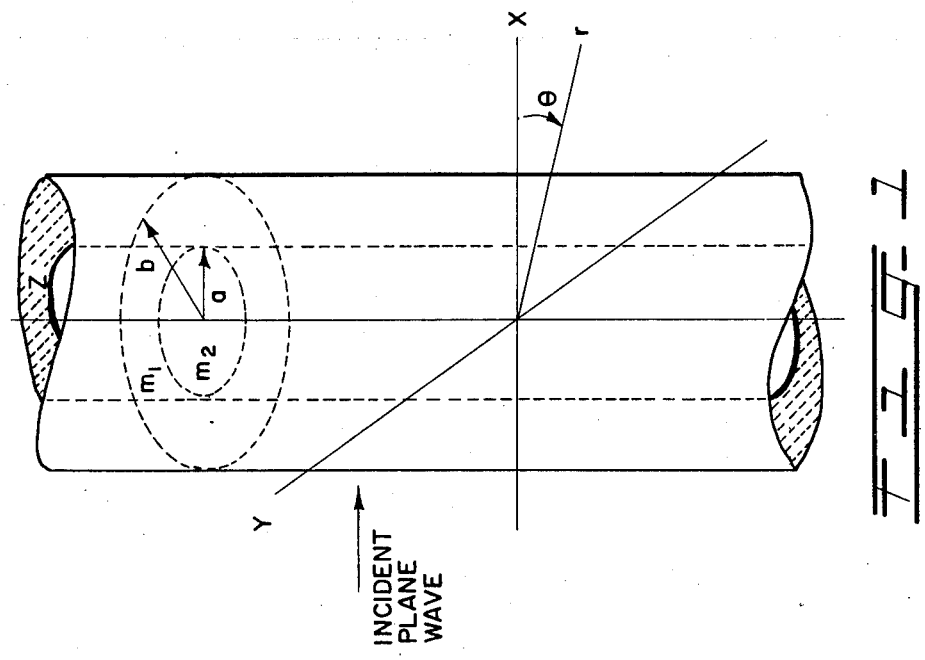
FIG. 1 is an isometric view of a typical clad optical fiber.

Referring to FIG. 1, if a collimated, single transverse mode beam of radiant energy, for example, a laser beam, is directed at a transparent fiber, perpendicular to its axis, light is scattered in a plane which is perpendicular to the fiber axis. The intensity of the light scattered, as a function of the angle measured from the forward direction of the original beam, is characteristic of the size of the fiber and its refractive index, and, in the case of a clad fiber, the core diameter and its index of refraction as well.

As will be shown below, calculations have been performed to determine the theoretical characteristics of the scattered light and the relationship of these characteristics to the four parameters of core and cladding diameters and refractive indices. The results which were obtained using precise wave theory, as well as those from a more simplified geometrical ray analysis, will be described. The validity of these results has been confirmed by comparison with experimentally measured light scattering patterns obtained by the use of a 0.633μm wavelength HeNe laser. In accordance with the invention, the scattering patterns so obtained may be used to measure critical fiber parameters, as will be more fully discussed below.

FIG. 1 is a diagram of an illustrative fiber and the coordinate axes which will be used throughout this specification. The axis of the fiber is in the z direction, and the incident plane monochromatic wave, for example, an HeNe laser beam, is directed along the x axis, in the positive-going direction. Cylindrical coordinates are used to describe the scattered light with $r$ being the distance from the z axis of the fiber and $\theta$ the angle from the x axis of the fiber. Therefore, as to any point in the xy plane, $$x = r \cos \theta, \text{ and, } y = r \sin\theta.$$

In this explanation, the incident light is assumed to be of constant amplitude, that is to say, the amplitude of the light does not fall off towards the edge of the field. This assumption is valid for typical optical fibers of 200μm diameter or less and laser beams of typically 2 mm diameter. Now, for light scattered in the forward direction, $\theta = 0°$, and for light scattered in the backward direction, $\theta = 180°$. The radius of the fiber core is $a$, and the core has a refractive index $m_2$; the radius of the total fiber is $b$ with the cladding layer having an index of refraction $m_1$. Thus, the cladding layer has a thickness $c = (b - a)$.

The solution of equations descriptive of the scattering of electromagnetic waves by a clad optical fiber made of nonabsorbing material has been reported by M. Kerker and E. Matijevic in the *Journal of the Optical Socity of America*, Vol. 51 (1961) pg. 506, who jointly extended the theory described by H. C. VanDerHulst in, *Light Scattering from Small Particles*, John Wiley and Sons, New York (1951), which theory covered scattering from dielectric cylinders (i.e., unclad optical fibers). The solution is derived by forming appropriate solutions of the scalar wave equation for three regions: (1) in the fiber core; (2) in the cladding; and (3) outside the fiber. This is done separately for each of the two polarization: (a) parallel to the fiber axis; and (b) perpendicular to the fiber axis. The solutions are given below for the case of electric-field polarization which is parallel to the fiber axis.

$$(r > b) \quad u = \sum_{n=-\infty}^{\infty} F_n \{J_n(kr) - b_n^o H_n(kr)\} \quad (1)$$

$$(b > r > a) \quad u = \sum_{n=-\infty}^{\infty} F_n \{B_n^1 J_n(m_1 kr) - b_n^1 H_n(m_1 kr)\} \quad (2)$$

$$(r < a) \quad u = \sum_{n=-\infty}^{\infty} F_n \{B_n^2 J(m_2 kr)\} \quad (3)$$

where $u$ is the resulting field amplitude at $r$, $\theta$; $k = 2\pi/\lambda$, $\lambda$ is the wavelength of the radiation, $J_n$ is the Bessel function of the first kind, $H_2$ is the Hankel function of the second kind and $b_n^0$, $B_n^1$, $b_n^1$, $B_n^2$ are complex coefficients.

In Equation (1) the first term represents the incident wave and the second term the scattered wave. The incident wave is a plane wave expressed in the form $$\psi = e^{i\omega t - ikx} = \sum_{n=-\infty}^{\infty} F_n J_n(kr) \qquad (4)$$

where
$$F_n = (-1)^n e^{in\theta + i\omega t}.$$

The complex coefficient $b_n^0$ is found by using the boundary conditions that mu and $m\delta u/\delta_r$ are to be continuous at the core/cladding and cladding/air interfaces. This leads to a set of four equations from which the coefficient is found:

$$b_n^o = \frac{\begin{vmatrix} J_n(\alpha_1) & H_n(m_1\alpha_1) & J_n(m_1\alpha_1) & 0 \\ J_n'(\alpha_1) & m_1 H_n'(m_1\alpha_1) & m_1 J_n'(m_1\alpha_1) & 0 \\ 0 & H_n(m_1\alpha_2) & J_n(m_1\alpha_2) & J_n(m_2\alpha_2) \\ 0 & m_1 H_n'(m_1\alpha_2) & m_1 J_n'(m_1\alpha_2) & m_2 J_n'(m_2\alpha_2) \end{vmatrix}}{\begin{vmatrix} H_n(\alpha_1) & H_n(m_1\alpha_1) & J_n(m_1\alpha_1) & 0 \\ H_n'(\alpha_1) & m_1 H_n'(m_1\alpha_1) & m_1 J_n'(m_1\alpha_1) & 0 \\ 0 & H_n(m_1\alpha_2) & J_n(m_1\alpha_2) & J_n(m_2\alpha_2) \\ 0 & m_1 H_n'(m_1\alpha_2) & m_1 J_n'(m_1\alpha_2) & m_2 J_n'(m_2\alpha_2) \end{vmatrix}} \qquad (5)$$

where $\alpha_1 = kb$ and $\alpha_2 = ka$.

The scattered light intensity is given by the second term in Equation (1). Since the scattered light is to be observed at some distance from the fiber, the asymptotic expression for $H_n(kr)$ can be used. The intensity for the scattered light is thus $I_p$ $$I_p = \left| \frac{2}{\pi kr} e^{(-ikr + i\omega t - \beta\pi/4)} \sum_{n=-\infty}^{\infty} b_n^o e^{in\theta} \right|^2 \qquad (6)$$

$$= \frac{\lambda}{\pi^2 r} \left| b_0^o + 2 \sum_{n=1}^{\infty} b_n^o \cos(n\theta) \right|^2,$$

since $b^o_{-n} = b^o_n$.

Similar results can be found for the light scattered when the incident radiation is polarized perpendicular to fiber axis, but these are not given here for brevity.

Of course, Equation (6) may be solved manually, but in view of the large number of points which must be plotted to obtain a useful scattering pattern, a manual solution is tedious. Accordingly, I found it preferable to employ a computer to perform the repetitive calculations necessary to solve Equation (6).

Figure 2:
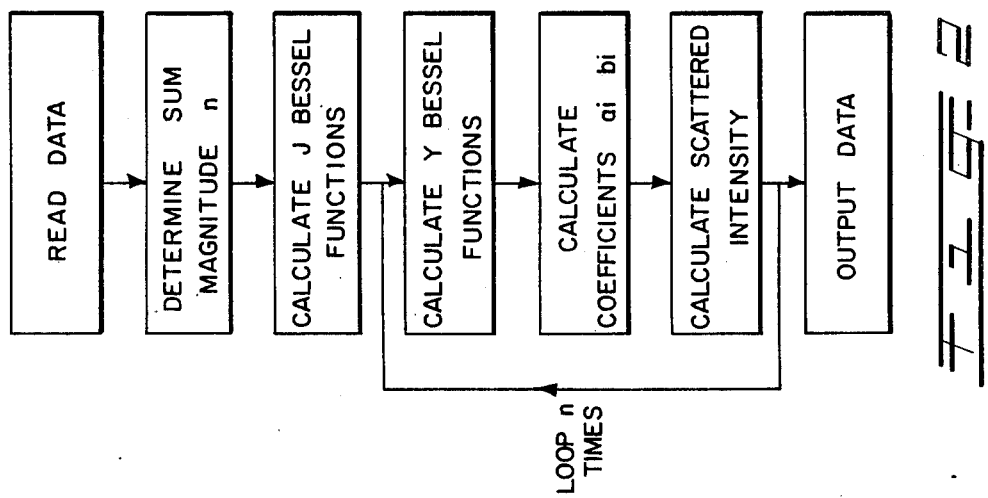
FIG. 2 is a flow chart useful in calculating the scattering pattern of the fiber shown in FIG. 1.

FIG. 2 shows the flow diagram which I employed to calculate the scattering intensity from Equation (6). It must be emphasized that this flow chart is trivial and forms no part of the invention; neither does the computer program which was written to implement this flow chart, which program is entirely routine, and well within the skill of any competent programmer.

Some interesting scaling problems were experienced in solving Equation (6) in this manner, and these will now be discussed, for the sake of completeness. In practice, the terms in Equation (6) tend to become zero for large values of $n$. It was found that in order to achieve this result, which greatly simplifies the mathematics, the number of terms, $n$, and to be greater than 40 for small diameter fibers and greater than $1.2\, m_1 b 2\pi/\lambda$ for larger diameter fibers. This conclusion was checked by simply calculating the contribution made to the diffraction pattern by the last 10 percent of the terms in Equation (6) and then keeping this contribution at a figure of less than $10^{-7}$. The J Bessel functions were then calculated using the downward recursion formula:

$$\gamma J_{l-1}(\alpha) = 2n\gamma/\alpha\, J_l(\alpha) - \gamma J_{l+1}(\alpha). \qquad (7)$$

An arbitrarily small value of $10-30$ was used for $\gamma J_l$ and l was made sufficiently large, by trial and error, until repeatable results were obtained. For small arguments ($\alpha < 100$), l was made $2.8\, n + 11$, as suggested by Lundberg. For large $\alpha$, l was stated at $1.2\, n$. After recurring down to $\gamma J_0$, the proportional constant $\gamma$ was found from the sum:

$$J_0(\alpha) + 2 \sum_{p=1}^{\infty} J_{2p}(\alpha) = 1. \qquad (8)$$

The values of $J_0$ up to an argument $\alpha = 50$ were confirmed by checking them against results published in standard Bessel Function Tables. For large values of l it was found that during recurrence, $\gamma J$ attained very large values exceeding the range of the computer. I, thus, found it necessary to use a scaling factor to keep the values within this range. It was necessary to keep track of this scaling factor since the values of J for large l might contribute a significant amount to the later computations even though their values were exceedingly small.

Finally, the values of J were returned to the main program in logarithmic form. This was found to be the easiest way to handle with large range of numbers. The sign was carried in a separate function.

The Hankel function $H_n$ is given by:

$$H_n = J_n - iY_n \qquad (9)$$

where $Y_n$ is the Bessel function of the second king. $Y_o$ was calculated by the asymptotic expansion:

$$Y_o(\alpha) = \left(\frac{2}{\alpha\pi}\right)^{\frac{1}{2}} \left[ \sin\left(\alpha - \frac{\pi}{4}\right) \left(1 - \frac{(-1)(-9)}{2!(8\alpha)^2}\right. \right. \qquad (10)$$

$$\left. + \frac{(-1)(-9)(-25)(-49)}{4!(8\alpha)^4} - \ldots \right)$$

$$\left. + \cos\left(\alpha - \frac{\pi}{4}\right) \left( \left(\frac{-1}{8\alpha}\right) - \frac{(-1)(-9)(-25)}{3!(8\alpha)^3} + \ldots \right) \right].$$

Subsequent values of $Y_l$ were calculated using the Wronskian relation, which is reported to yield slightly more accurate results than are obtained by using upward recurrence. This relationship is:

$$J_l(\alpha) Y_{l+1}(\alpha) - J_{l+1}(\alpha) Y_l(\alpha) = 31\, 2/\alpha\pi. \qquad (11)$$

Derivatives for both J and Y were calculated from the equation:

$$C_l'(\alpha) = C_{l-1}(\alpha) - l/\alpha\, C_l(\alpha). \qquad (12)$$

Again, all the values were returned to the main program in logarithmic form since $Y_l$ attains very large values for large l.

The individual terms of the numerator and denominator determinants were also computed in logarithmic form. They were then converted to standard form with a common scaling factor and the determinants calculated. After the final division to obtain $b_n$ or $a_n$, the scaling was removed to give the final value. In this way, the coefficients were calculated without exceeding the range of the computer or losing terms which contribute significantly to the final result, even though their values at a particular point were very small.

Finally, the scattering functions were calculated using Equation (6). It is interesting to note that to calculate 256 points for a clad optical fiber of 160$\mu$ diameter took only 30 minutes on an IBM 360/50 computer, usng double precision, which amply justifies the time taken to write the necessary computer program.

By using an arbitrary core size ranging from zero to the total fiber size and by making the refractive index of the core equal to the refractive index of the cladding layer, the program employed also gave results for unclad fibers. This relationship was employed to check the validity and operation of the computer program used. For example, if the core size is varied, no variation in the scattering pattern should occur. Secondly, the results of any computer run may be compared with those published by others, for example Lundberg.

FIG. 3 shows a plot of Lundberg's calculated results for an unclad fiber together with comparable results from the program I employed superimposed thereon. This graph confirms that the program yields the correct results for fiber sizes of about 30$\mu$. It was also found that varying the core size in no way affect the results at all provided that the refractive indices of the core and cladding were maintained at the same value.

In accordance with the invention, I have discovered that there are two distinct regions of significance in the scattering pattern shown in FIG. 3. I have further discovered that these two regions may advantageously be employed in the performance of certain of the measurements to be discussed below.

As shown in FIG. 3, beyond about 7°, the scattering pattern varies in intensity in a sinusoidal fashion as a function of the scattering angle. The period of this variation is relatively constant and, as will be seen later, is inversely related to the fiber diameter.

The behavior of this fringe pattern can be explained in a simple geometric manner by referring to FIG. 4. As shown, there are two paths by which light rays can be bent to a direction $\theta$ from the axis. One path is by reflection from the surface of the fiber, the other is by refraction through the fiber. Interference between these rays, whose path lengths vary with changes in the value of $\theta$, causes the observed fringe pattern. The derivation of the equation which gives the path difference $\Delta$ between the reflected and refracted beams for an unclad fiber is set forth below.

Referring again to FIG. 4, by tracing rays along the wave normals in a beam, it is possible to calculate the path lengths of the waves. The object, therefore, is to trace two rays that both leave the fiber at an angle $\theta$, one of which is refracted through the fiber and the other of which is reflected from it, as shown in FIG. 4. Since these two rays both leave the fiber at an angle $\theta$ in the far field there will be interference between the two waves reresented by these rays. This geometric ray approach has some limitations, two of which must be considered here. As taught by VanDerHulst, one limitation is that the fiber must be large compared to the wavelength of the light. The second is that if rays converge to a focus, a region of infinite energy is produced. Here the geometric approach breaks down, since the waves in this focal region are no longer normal to the geometric rays. VanDerHulst states that if the rays pass through a focal line, such as F, in FIG. 4, then the phase of that ray must be advanced by $\pi/2$ radians, which is equivalent to shortening the path length by a quarter wave ($\lambda/4$).

The ray incidence angle $\alpha$ is given by Snell's law for a particular scattering angle $\theta$, by the equation:

$$\sin \alpha = m \sin (\alpha - \theta/2) \qquad (13)$$

where $m$ is the index of refraction. This can be rewritten in the following way, which will be more convenient for use in later calculations.

$$\sin\alpha = \frac{m \cos \alpha \sin \frac{\theta}{2}}{m \cos \frac{\theta}{2} - 1}. \qquad (14)$$

The optical path length of the refracted ray may now be calculated and is given by p, where $$p = 2 \, mb \cos (\alpha - \theta/2) \qquad (15)$$

where $b$ is the fiber radius. Since this ray is the one passing through a focal line, its length must be reduced by a quarter wave, therefore, $$p = 2 \, mb \cos (\alpha - 0\,\theta/2) - \lambda/4 \qquad (16)$$

where $\lambda$ is the wavelength of the light. The optical path of the reflected ray to the same relative positions is 2u, where $$u = b \cos \alpha - b \sin \theta/2 + \lambda/2 \cdot \qquad (17)$$

Thus, the optical path difference, $\Delta$, between the reflected and refracted ray is given by:

$$\Delta = p - 2u = 2[m \, b \cos (\alpha - \theta/2) - b \cos \alpha + b \sin \theta/2] + \lambda/4 \qquad (18)$$

$$2b \, [\sin \theta/2 + \sqrt{m^2 + 1 - 2m \cos \theta/2}] + \lambda/4.$$

where, $$\tan \alpha = \frac{m \sin \frac{\theta}{2}}{(m \cos \frac{\theta}{2} - 1)}, \qquad (19)$$

$\theta$ is the forward scattering angle, $m$ is the refractive index and $b$ the fiber radius.

In Equation (18), the phase difference, $\Delta$, is seen to be proportional to $b$, the fiber radius. Thus, at a given scattering angle $\theta$, the fringe spacing over a small angle range $\Delta\theta$ is inversely proportional to the fiber diameter, so the fringes will be closer together as the fibers get larger. This, of course, is the basis of my invention for measuring fiber diameter. That is to say, at a given reference scattering angle $\theta_R$, counting the number of fringes which occur within the angle range $\Delta\theta_R$, centered about $\theta_R$, and then solving Equation (18) for $b$. Of course, as used throughout this specification, and in the claims, the expression "counting the number of fringes" includes counting fractional parts thereof and is not restricted to integer number of fringes. p Now, angle $\alpha$ is the incidence angle of the refracted ray. This has a maximum value of $\pi/2$ which establishes an upper limit on the validity of this formula with respect to the scattering angle $\theta$. The condition is:

$$m \cos \theta/2 \geqq 1. \qquad (20)$$

Thus, for a scattering angle greater than the maximum given by Equation (20), the fringe pattern should disappear. For a quartz, unclad fiber, this cut-off angle, which I call $\theta_F$, should be $\theta_F = 93.3°$; for a glass fiber of index 1.52, $\theta_F = 97.6°$, and for a glass fiber of index 1.62, $\theta_F = 103.8°$. For fiber diameter measurements, then, it is necessary that:

$$\theta_R \pm \tfrac{1}{2}\Delta\theta_R < \theta_F$$

Figure 6:
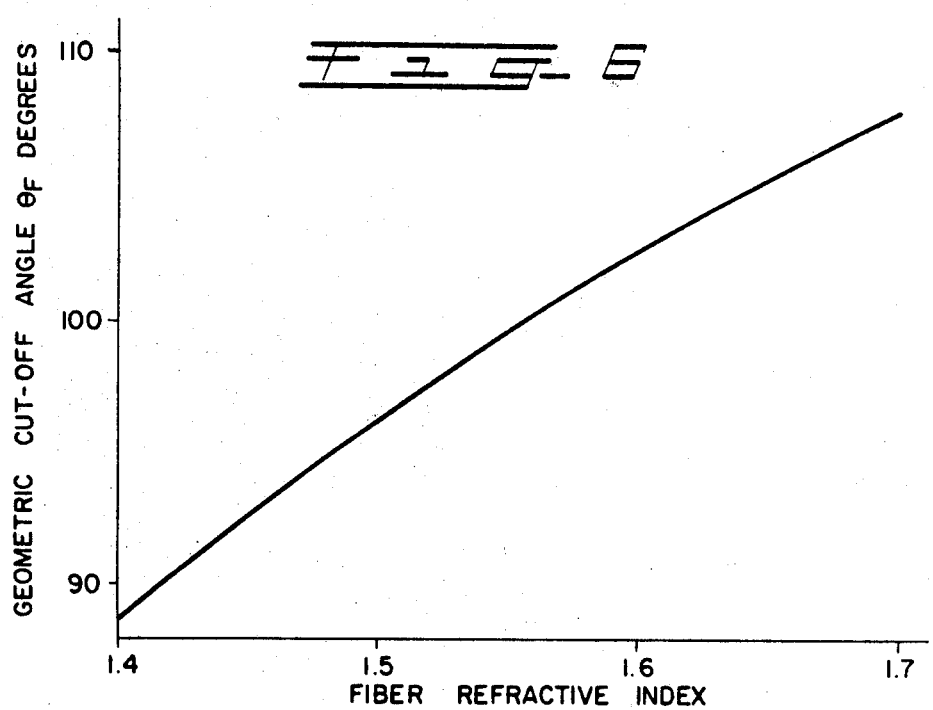
FIG. 6 is a graph showing the manner in which the geometric cut-off angle of the fiber varies as a function of fiber refractive index.

FIG. 5 shows an experimentally measured scattering pattern, together with a best fit theoretical pattern, for the scattering angle range of 70° - 105°, for a 29μm unclad, fused silica fiber with light polarized parallel to the fiber axis. The discrepancies between the theoretical and experimental patterns will be discussed later. What is apparent, however, is that although the fringe pattern does fade out, it has a gradual decay without a sharp discontinuity and so could not be used to accurately determine the refractive index of a fiber. FIG. 6 is a plot of the cut-off angle $\theta_F$ vs. refractive index and shows the quite large variation of cut-off angle $\theta_F$ with refractive index. FIG. 7 is a scattering pattern similar to that shown in FIG. 5, except that it is for the scattering range of 35°–105°.

The best fit theoretical patterns shown in FIGS. 5 and 7 were found by matching as closely as possible the positions of the maxima and minima of the patterns over the 35°–105° range. The intensity comparison is somewhat arbitrary and was made equal at the maximum, which occurred at approximately 74°. Thus, absolute comparisons between intensity should not be made; just comparisons between their variations in intensity.

As previously mentioned, discrepancies between the theoretical and the experimental patterns in FIG. 5 were noted. It is believed that these are most probably due to the particular fused silica fiber sample which was employed for the experiment, which upon later examination, was found not to be perfectly circular in cross-section. The effect of this non-circularity is to give a variation in intensity of the maxima and also to give small deviations of the fringe position with respect to angle. This observation suggested to me a technique for measuring fiber non-circularity. For example, at the given reference angles, $+\theta_R$ and $-\theta_R$, one compares the fringe patterns present in the angle range $\Delta\theta_R$. If the fiber is non-circular, both fringe patterns will be offset to the right (or left). That is to say, one fringe pattern will be closer to the origin ($\theta = 0$) than theory predicts, while the other pattern will be correspondingly further away from the origin. The degree of relative pattern shift is, of course, proportional to the fiber non-circularity, and if the system is calibrated with fibers of known eccentricity, the non-circularity of an unknown fiber may readily be ascertained. For fibers with larger eccentricities, fringe counts on each side of the fiber can also be made.

As discussed, FIG. 7 is a comparison of theory and experiment for the scattered intensity over the angle range 35°–70° for the same fiber used in FIG. 5, again for the case of parallel polarization. The same discrepancies which were noted in FIG. 5 between theory and experiment were found in FIG. 7 and are also believed to be due to the elliptical, non-circular fiber cross-section. However, this latter plot demonstrates the high contrast fringes which may be obtained. Calculations also show that the maxima and minima positions predicted by Equation (18) are correct over the angle range from ~7° to $\theta_F$.

Figure 8:
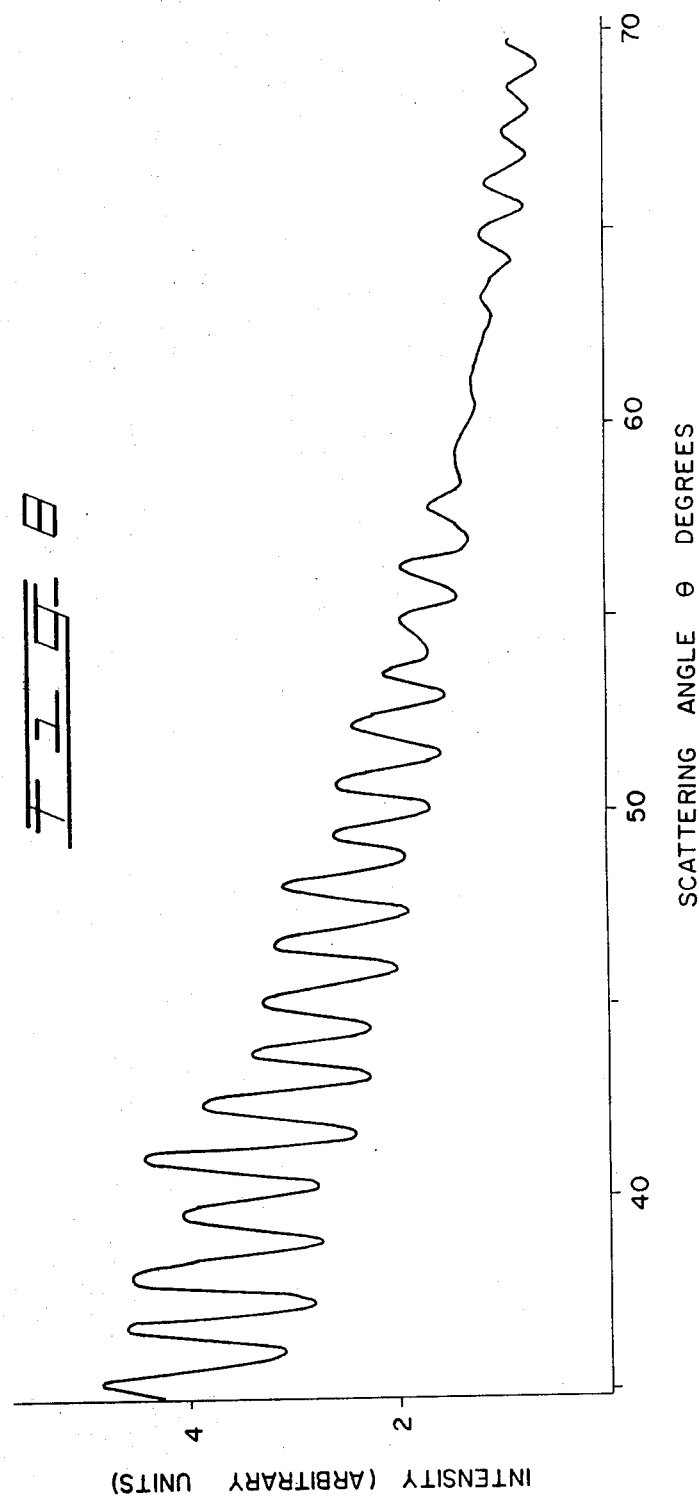
FIG. 8 is a graph showing the scattering pattern of a fiber when perpendicularly polarized light as used to generate the pattern.

FIG. 8 shows the theoretical plot for the case of incident light polarized perpendicular to the fiber axis. The same fringes are present; however, the contrast is considerably less and even approaches zero at one angle. This lower fringe contrast was confirmed in the experimentally derived scattering patterns. Thus, although perpendicular polarization may be used in any of the measurement techniques disclosed herein, because of the low-fringe contrast which makes accurate measurements difficult, the preferred polarization is parallel to the fiber axis.

Figure 9:
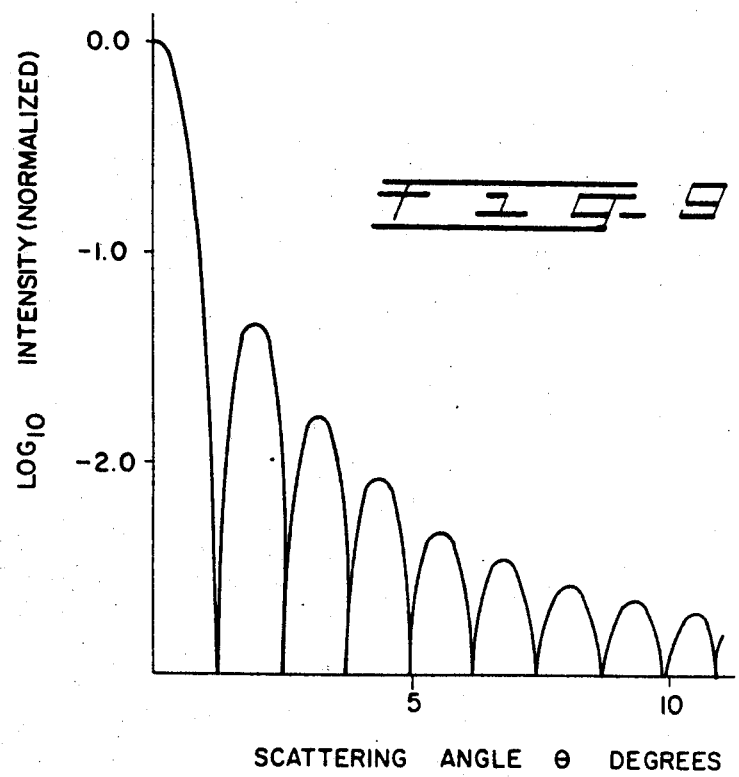
FIG. 9 depicts the classic $\sin^2$ diffraction pattern of an opaque fiber.

For the region $\theta = 0°$ to $\theta = 7°$, there is yet another effect which superimposes itself on the interference effects discussed above, that is, the diffraction of light which is not intercepted by the fiber. If the fiber were opaque then the diffraction pattern in the far field would have an intensity distribution as shown in FIG. 9. This is, of course, the classic $\sin^2$ distribution caused by the bending of the light transmitted at the edge of the opaque object by virtue of the wave properties of light, and is the basis of the prior art opaque filament measuring techniques discussed in the introduction.

Considering a transparent fiber, however, very near to 0°, the interference effect discussed in the previous section disappears. There is still a refracted ray which goes through the fiber; however, in the limit of 0° there is no reflected ray. The result is that the scattering pattern near 0° is the superposition of the diffracted light and the transmitted light, taking due account of the phase differences between them. As the angle increases from zero, the interference effect begins and the pattern resulting is the superposition of the diffracted light and the interfering reflected and refracted light. At progressively larger angles, the contribution from diffraction is reduced until at about 7° only the interference effect dominates. The change at 7° is not a constant, but varies with the size of the fiber under examination, and increases with smaller fiber diameters. I have also discovered that the interference effects are dependent on both the diameter of the fiber and its refractive index. The diffraction effects, however, are only a function of the fiber diameter. Thus, if the refractive index of the fiber is known, by measuring the angle at which the diffraction contribution to the overall pattern disappears, and then comparing this angle with the corresponding angle from a fiber of known diameter, one obtains yet another technique for measuring fiber diameter.

Figure 10:
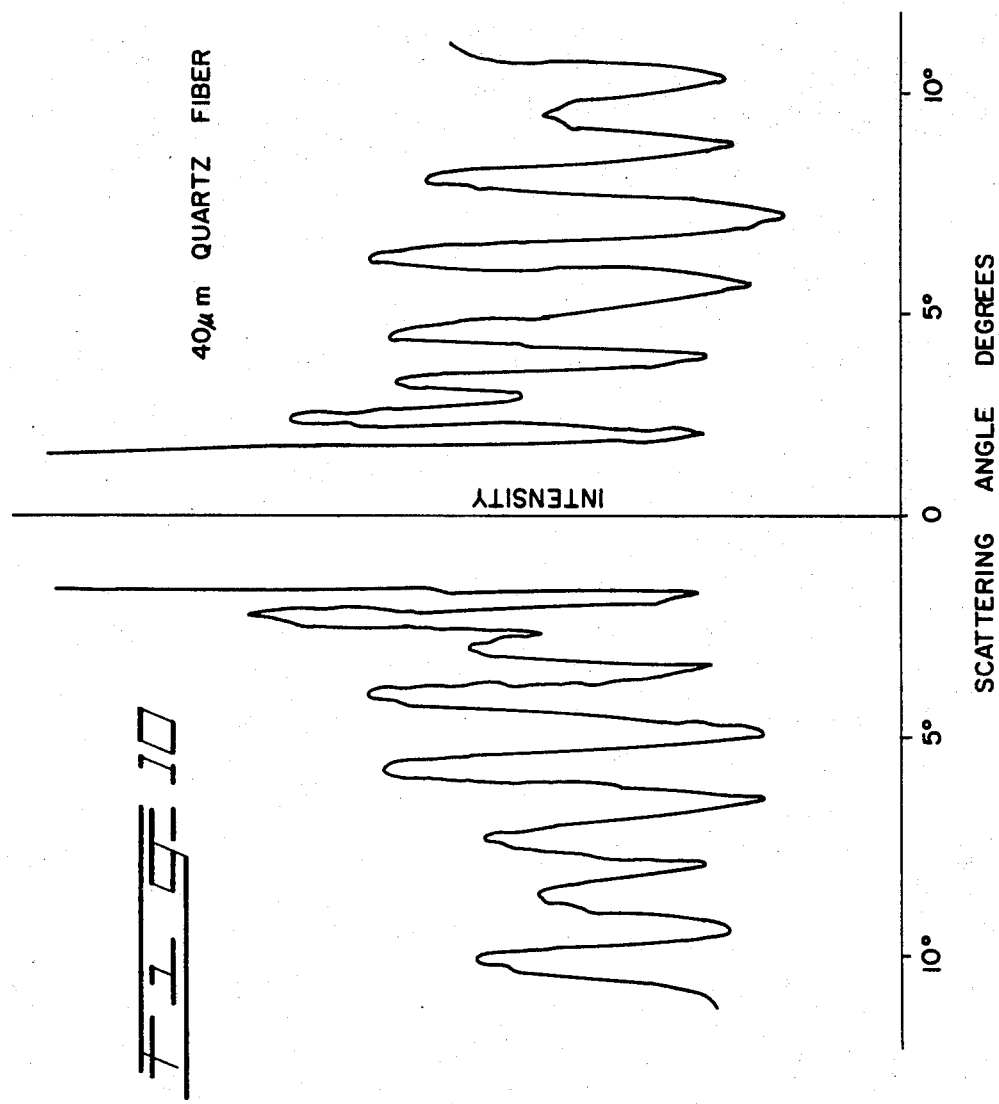
FIG. 10 is a graph depicting the forward scattering pattern of a noncircular unclad fiber.

FIG. 10 shows the measured forward scattering pattern over the range +10° to −10° for a typical unclad fiber, for example, a 40μ quartz fiber. It will be seen that the pattern is not symmetrical about the zero axis and that the amplitude of corresponding maxima are different; the effect being most noticeable at the lower scattering angles. As previously discussed, the explanation for this effect is believed to be the non-circularity of the fiber cross-section. Eccentricities of up to 0.05μm were measured in the experimental sample actually used to generate FIG. 10. An explanation of this phenomenon is that the refracted rays for the two sides of the scattering pattern have a small difference in phase induced therein because of the non-circular cross-section. This results in different amplitudes in the lobes of the forward angle where the interference between the refracted ray and the diffraction pattern occurs. The technique for measuring fiber non-circularity, discussed above, utilizes to good advantage the asymmetrical nature of the scattering pattern but does not directly utilize the observed differences in corresponding fringe maxima.

Figure 11:
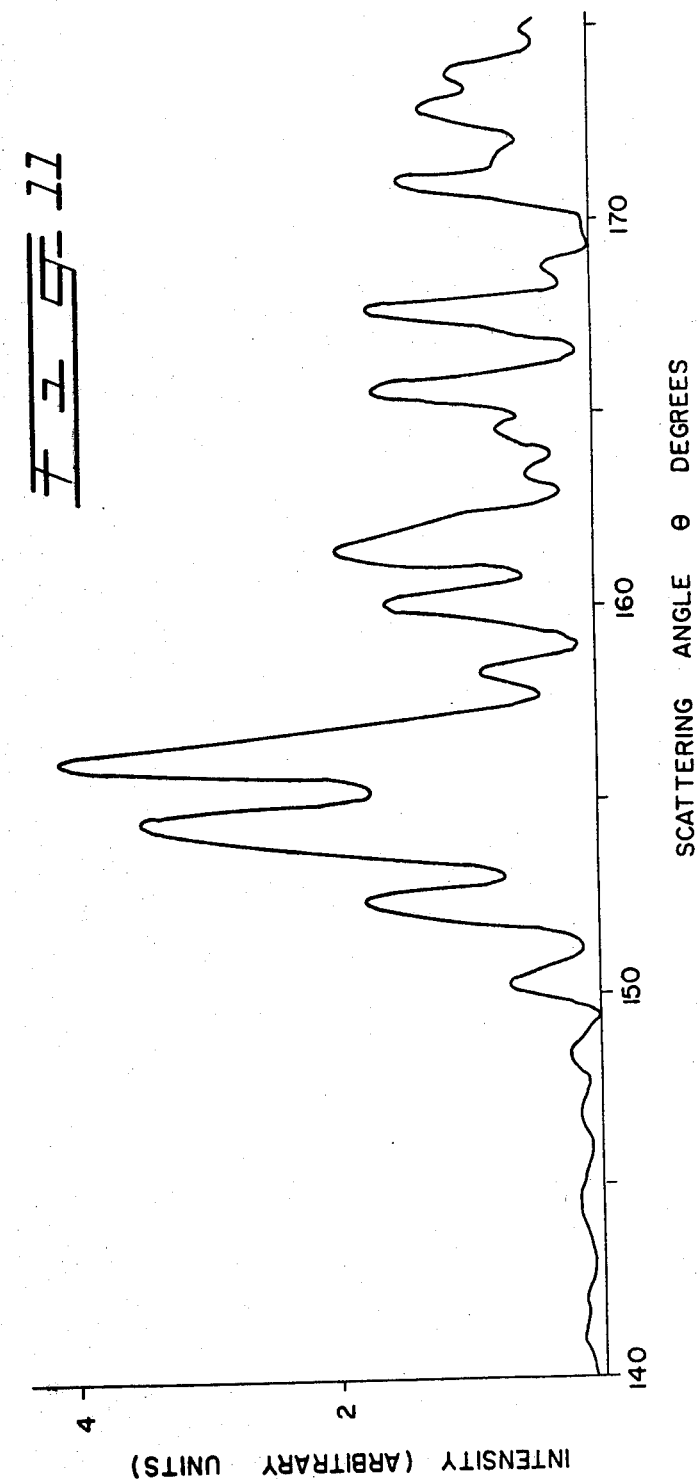
FIG. 11 is a graph showing the predicted backward scattering pattern of an unclad fiber.

The immediately preceding discussion, it will be recalled, dealt with scattering in the range $\theta = 0°$ to $\pm 10°$. FIG. 11, on the other hand, shows the theoretical scattered intensity (derived from wave theory) for a typical unclad quartz fiber of 35μm diameter for the scattering angle range of 140°-175°, that is to say, in a direction which is almost directly towards the source. It will be noted, that there is a definite cut-off in the scattered intensity at about 152.5°, as predicted by geometric ray trace theory for parallel polarization. It was also found that this cut-off angle depends only on the refractive index of the fiber, in agreement with theory. It will be noted also that there is a fringe structure of sorts above 150°, however, there is also a finer fringe structure superimposed thereon which makes these fringes indistinct. A proposal has been made to use these fringes as a method of measuring the fiber diameter. However, it is apparent from comparing these fringes with those obtained for the forward angle of between 10°-90° that the forward scattering pattern is easier to measure and gives more accurate results.

Figure 12:
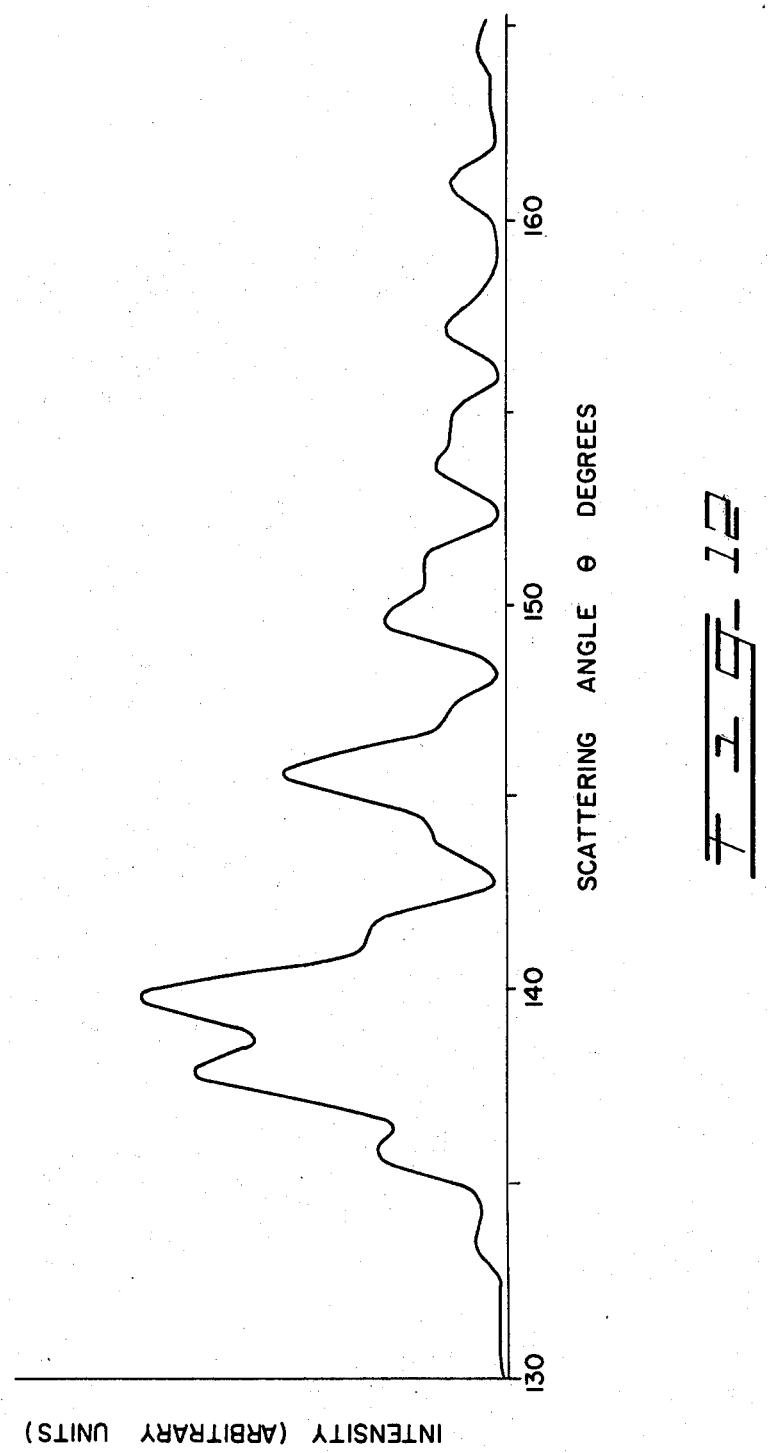
FIG. 12 is a graph showing the actual backward scattering pattern of an unclad fiber not perfectly circular in cross section.

FIG. 12 shows the experimental scattering pattern obtained from an unclad fiber using parallel polarization, over approximately the same scattering angle range used in FIG. 11. The fiber cross-section, however, was not perfectly circular and there was up to a 10 percent difference in orthogonally measured diameters of the sample. The cut-off effect is, nevertheless, quite evident; however, the cut-off angle differs by approximately 15° from that shown in FIG. 11 because of the non-circular cross-section of the fiber. The fine fringe structure previously noted is present to some extent, although the magnitude is less than that predicted by theory.

So far we have been considering only unclad fibers, however, for optical communications purposes, clad fiber is preferred. As one would expect, the forward scattering pattern which is obtained from a clad fiber can also be divided into two regions of interest, (a) 0°-7°, and (b) 10° to about 100°. These two regions will be discussed first and finally the backscattering region beyond approximately 100°.

Figure 13:
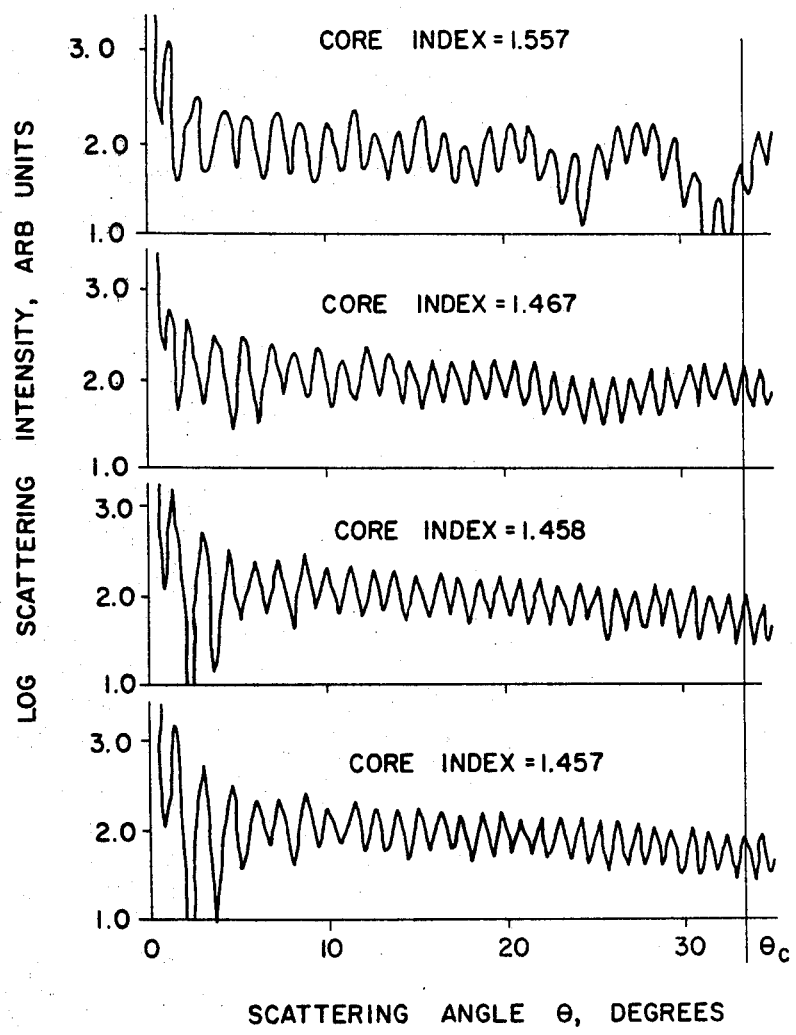
FIGS. 13–15 are graphs depicting the predicted scattering patterns for clad optical fibers of differing refractive index, over three separate angle ranges.
Figure 14:
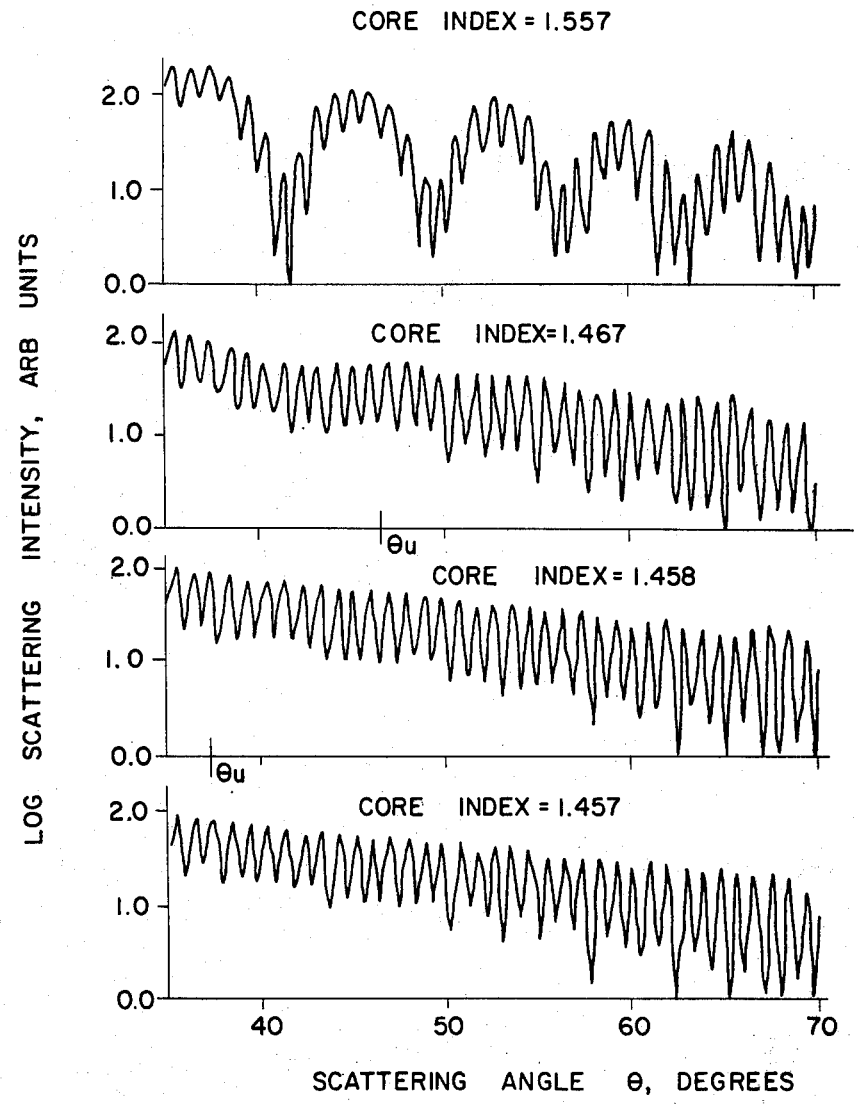
Figure 15:
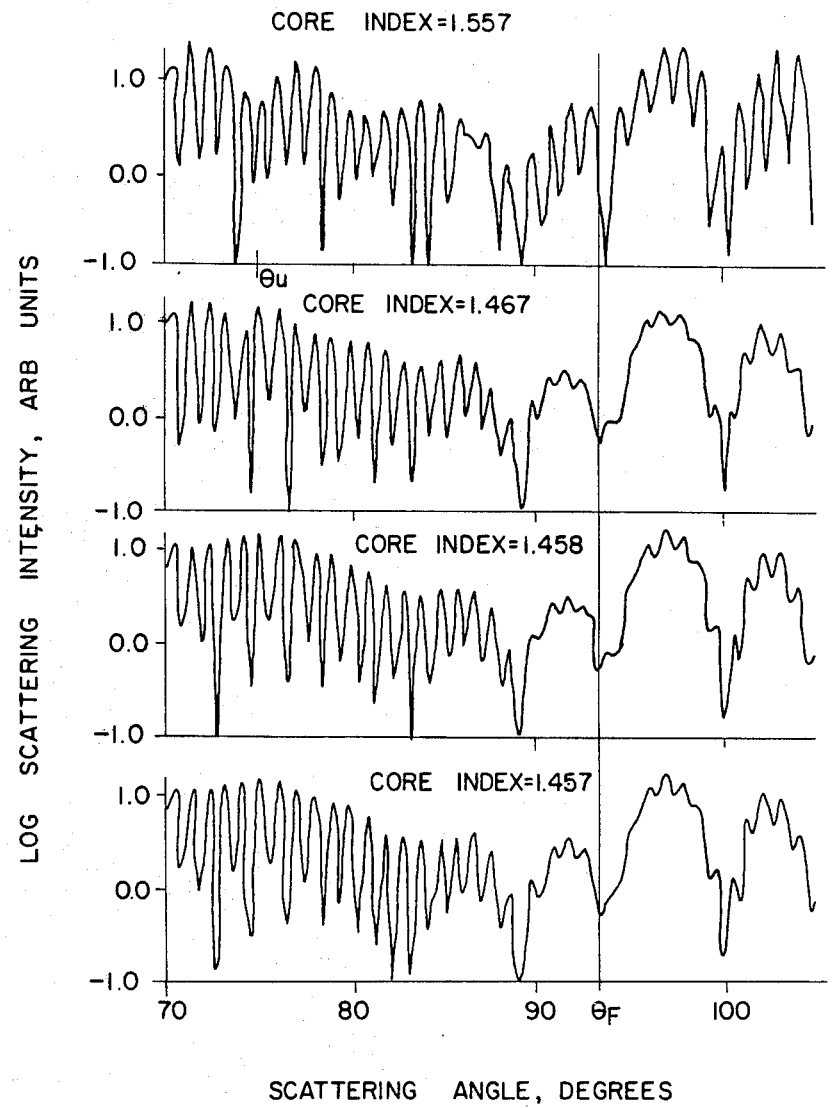

FIGS. 13, 14, and 15, respectively, show the calculated scattering patterns between 0°-35°, 35°-70°, and 70°-105° for a typical clad quartz fiber having an outer diameter of 43.05μm. The core diameter was 20μm and the four graphs within each figure represent different core indices for a fixed cladding index of 1.457. The bottom graph thus represents an unclad fiber for comparison purposes. The graphs shown are for incident beam polarization parallel to the fiber axis, which is the preferred polarization. As can be seen, the most obvious effect of an increase in core index is the production of a modulation in intensity of the fringe pattern. This modulation is not perceptable with only a 0.001 index difference between the core and cladding but is definitely present with 0.01 index difference and is quite large with the 0.1 index difference. One feature which can be seen in FIGS. 13, 14, and 15 is that the period of the modulation (as a function of scattering angle $\theta$) varies with the difference in index difference. In addition, further experiments have demonstrated that the angular position position $\theta_C$ of the beginning of this modulation increases with increases in the core-to-fiber diameter ratio. These observations led me to conceive of a technique wherein the difference between the core and cladding indices could be measured for a fiber of known geometry or, alternatively, how the ratio of the core-to-fiber diameter could be measured for a fiber of known composition. Or, if desired, both measurements could be made simultaneously. In the first case, at a given scattering angle $\theta_R$, the periodicity and angular position of the modulation is measured over the angle range $\Delta\theta_R$, where $\theta_R + \frac{1}{2}\Delta\theta_R < \theta_F$. This periodicity and angular position is then compared to the periodicity and angular position of known fibers of comparable geometry, taken at the same scattering angle. This yields the numeric difference between core and cladding indices; hence, if either is known, the other can be readily calculated. On the other hand, if the indices of the core and cladding are known, but the fiber geometry is not, the value of $\theta_C$ can be used to find the core-to-fiber diameter ratio. Then, if either the core size or overall fiber diameter is known, the other can be calculated. In FIG., $\theta_C$ is shown to be about $\theta = 33°$.

Figure 17:
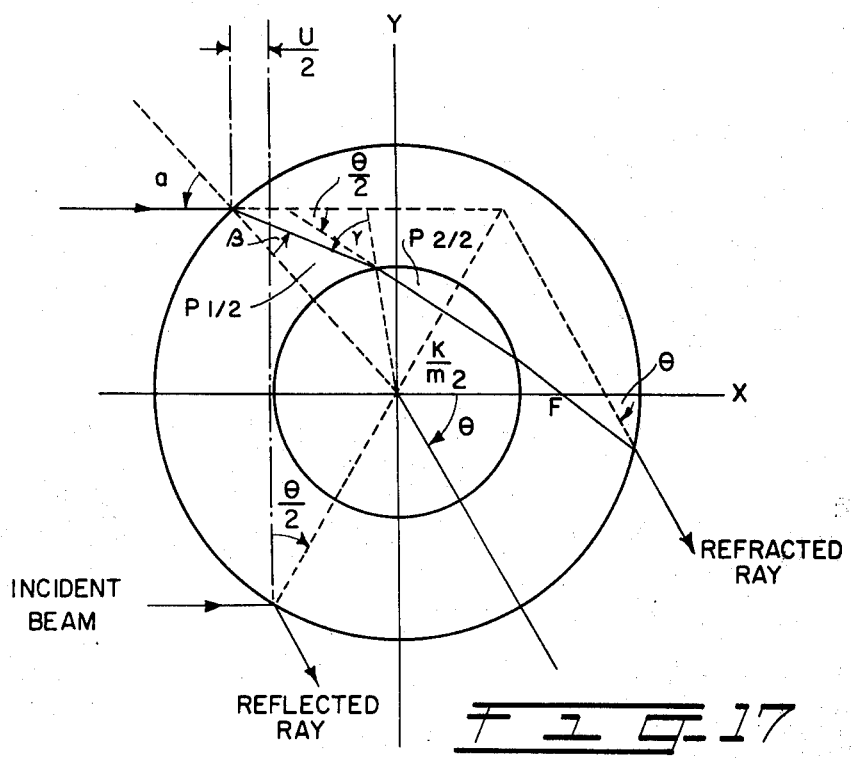
FIG. 17 is a drawing similar to FIG. 4, but for a clad fiber.
Figure 18:
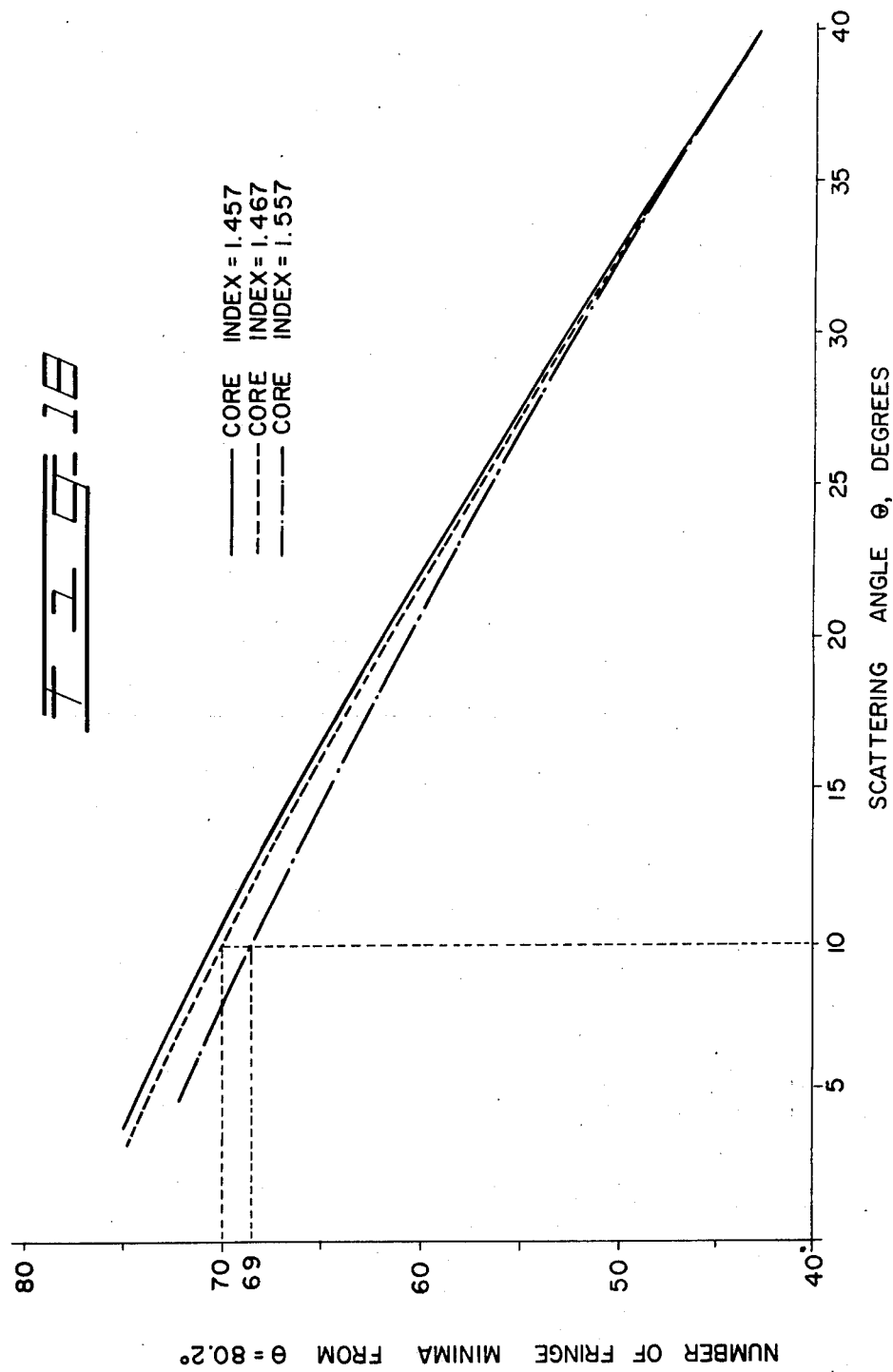
Figure 19:
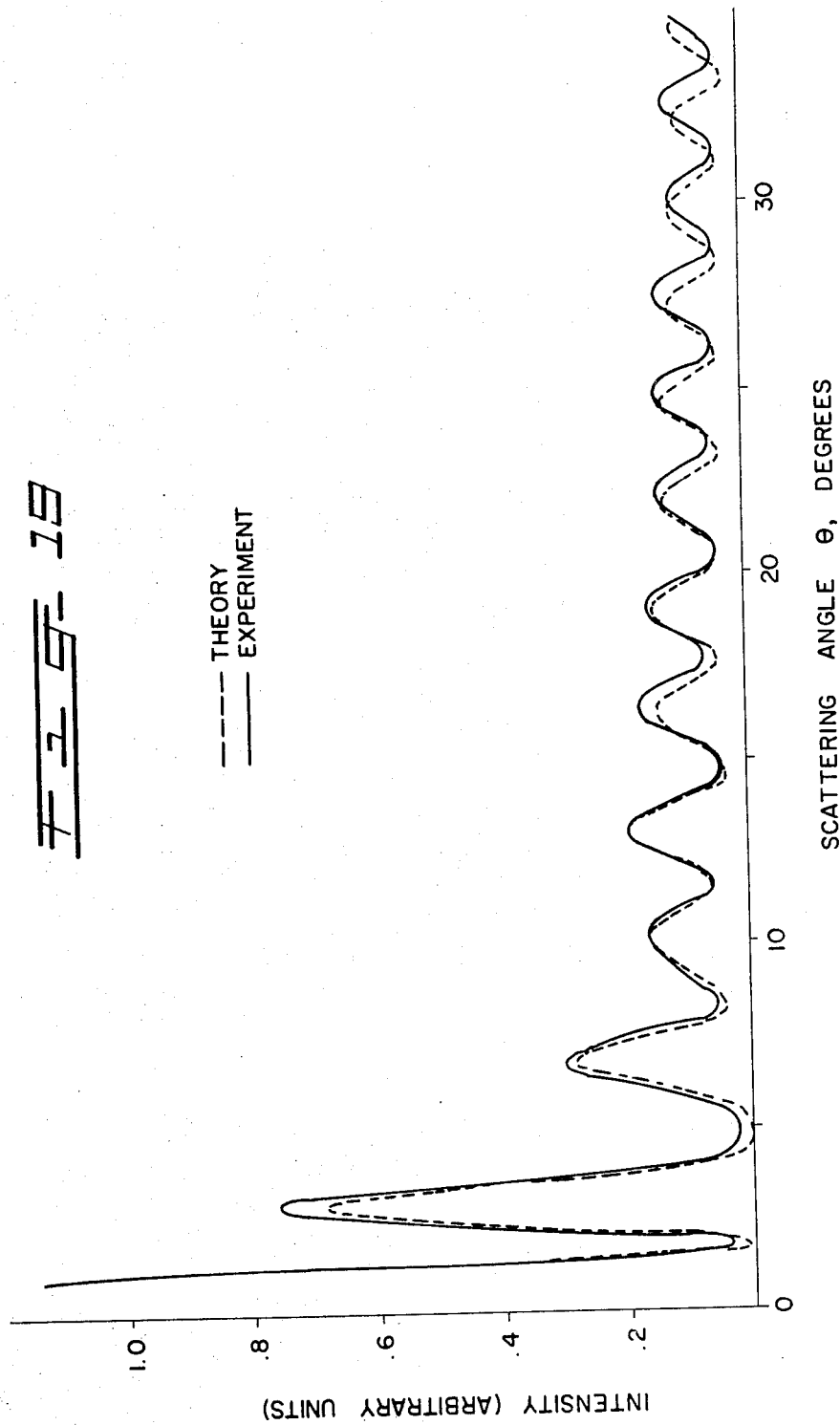
FIGS. 19–22 are graphs comparing the actual and predicted scattering patterns of a clad fiber, over three distinct angle ranges.
Figure 20:
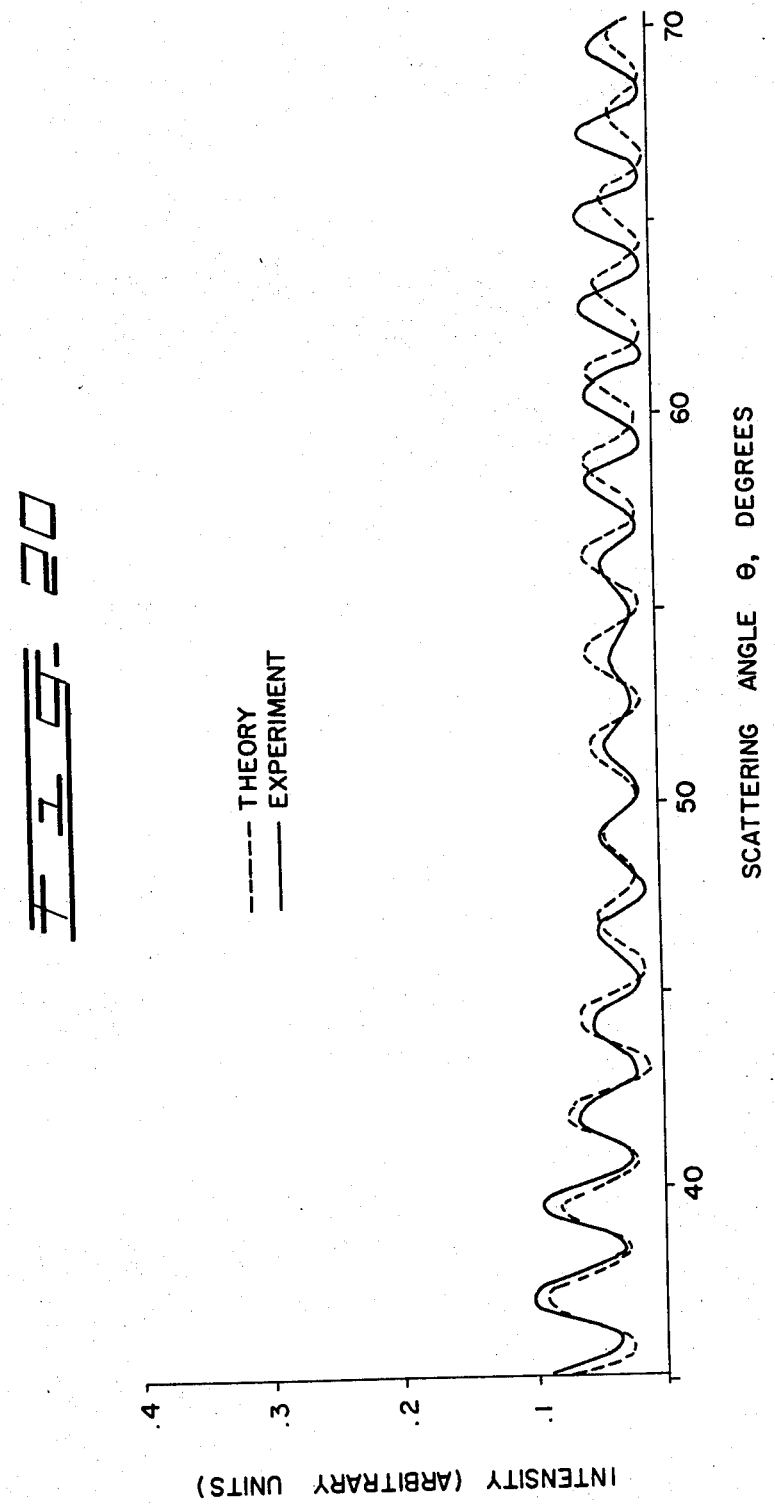
Figure 21:
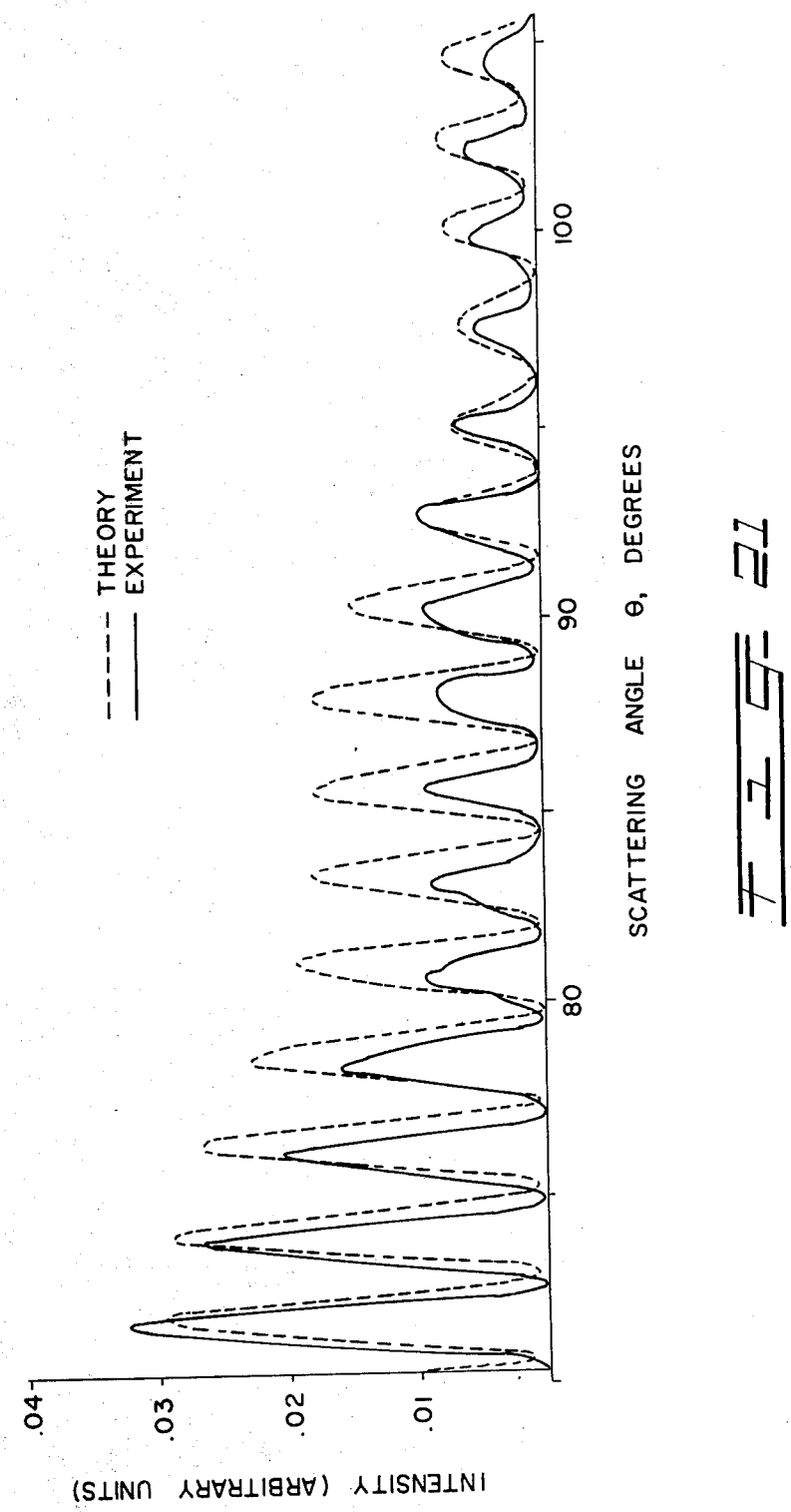
Figure 22:
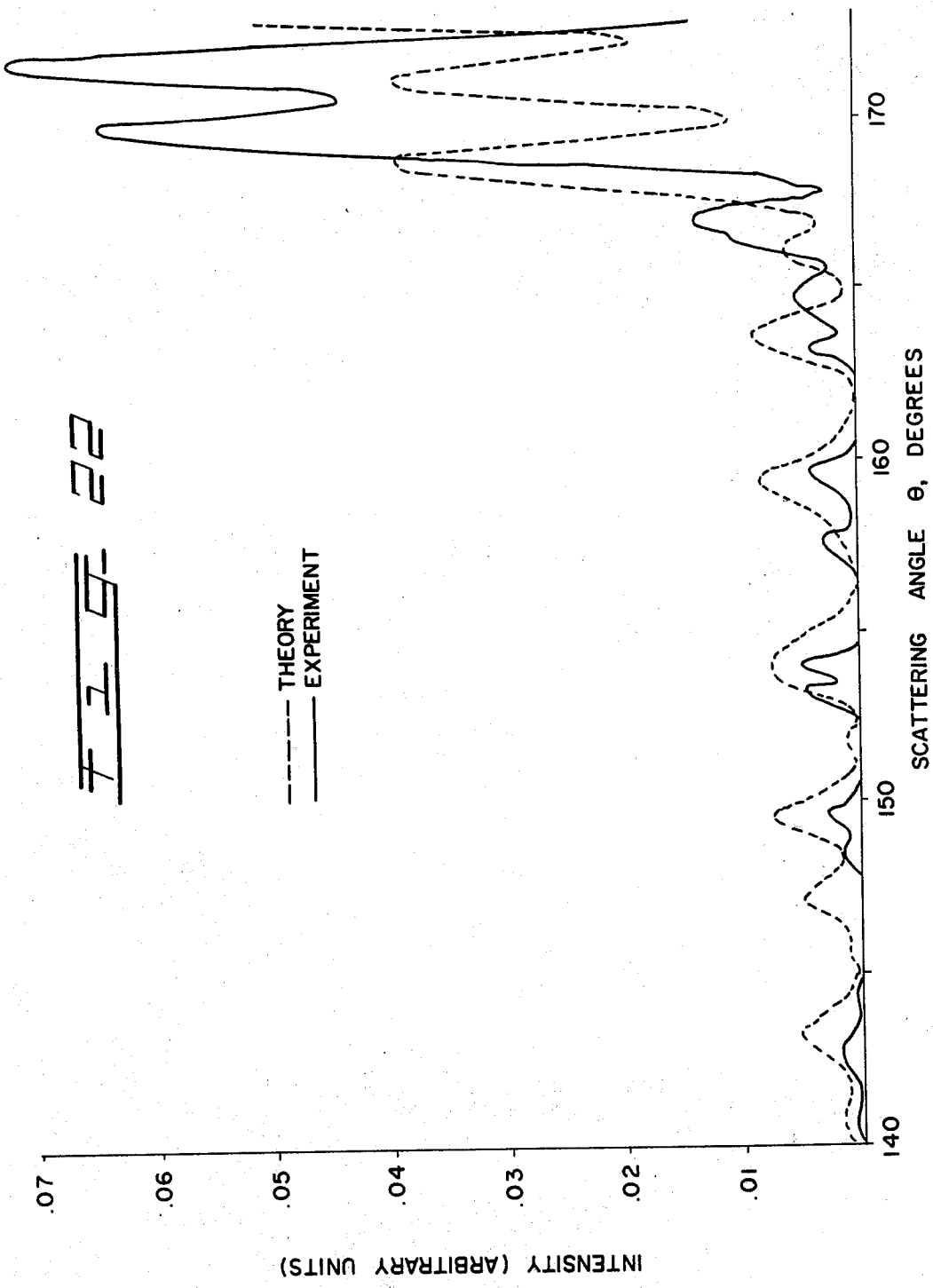
Figure 23:
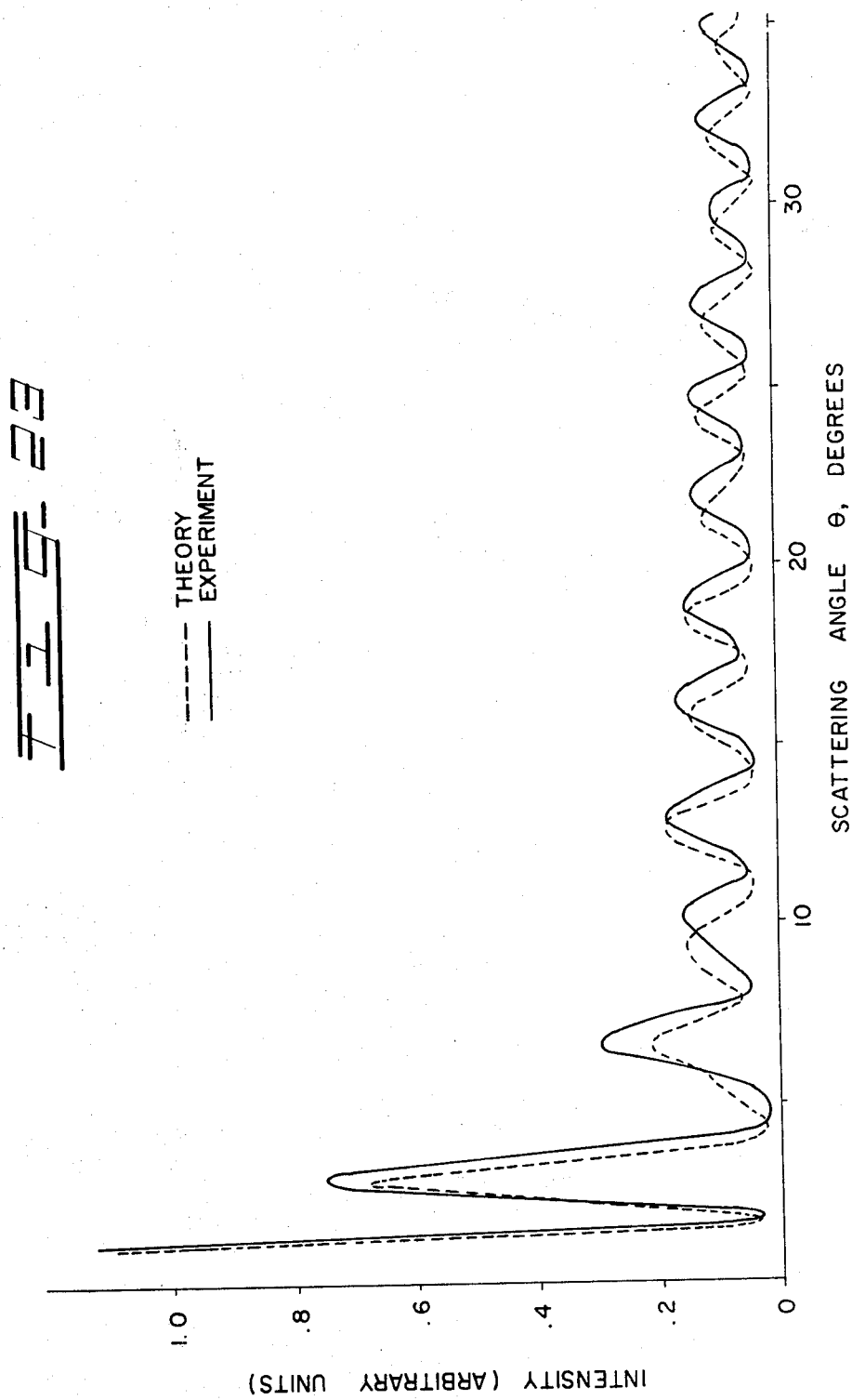
FIGS. 23–26 are graphs similar to FIGS. 19–22 for a different fiber over the same angle ranges.
Figure 24:
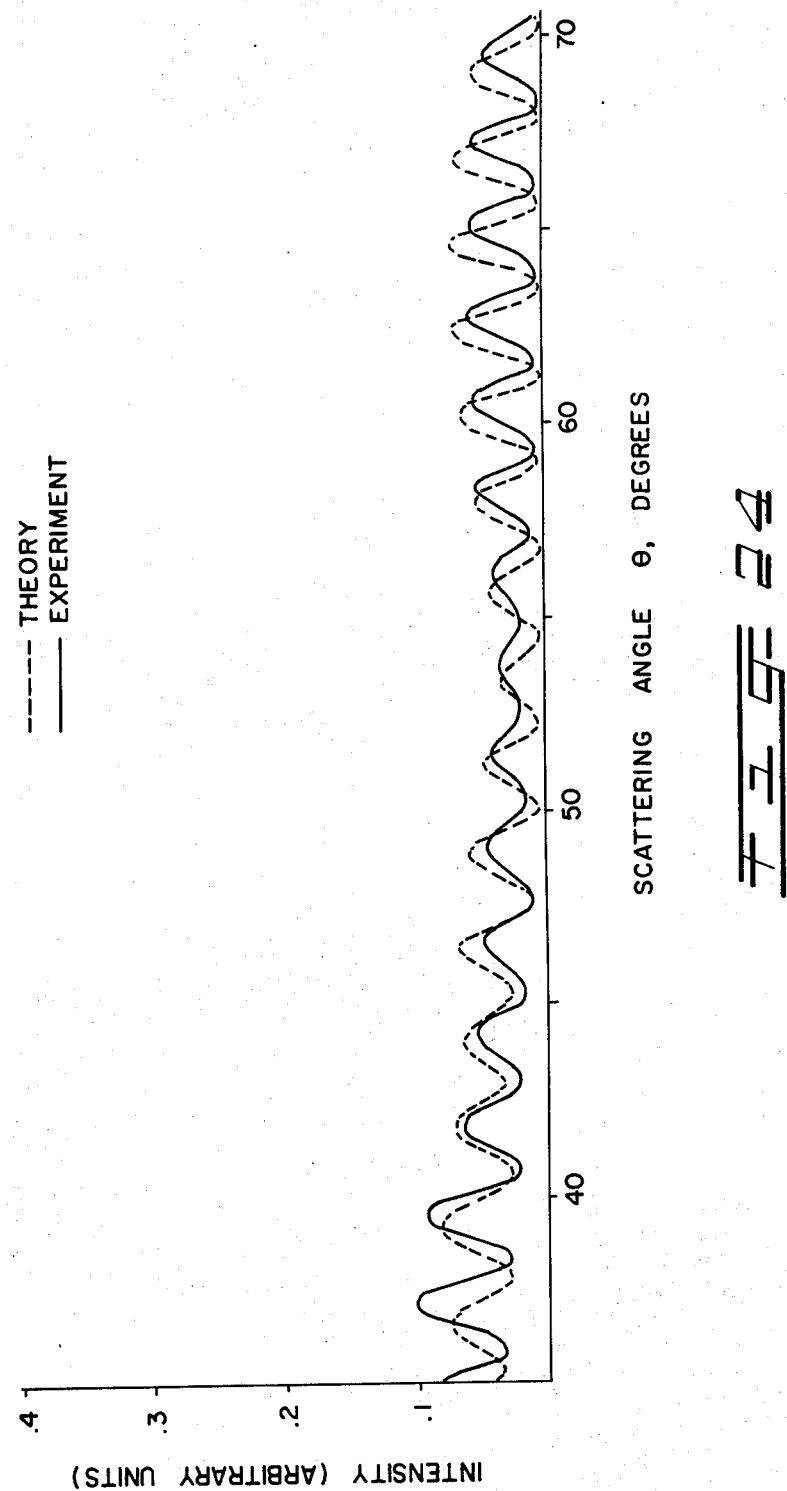
Figure 25:
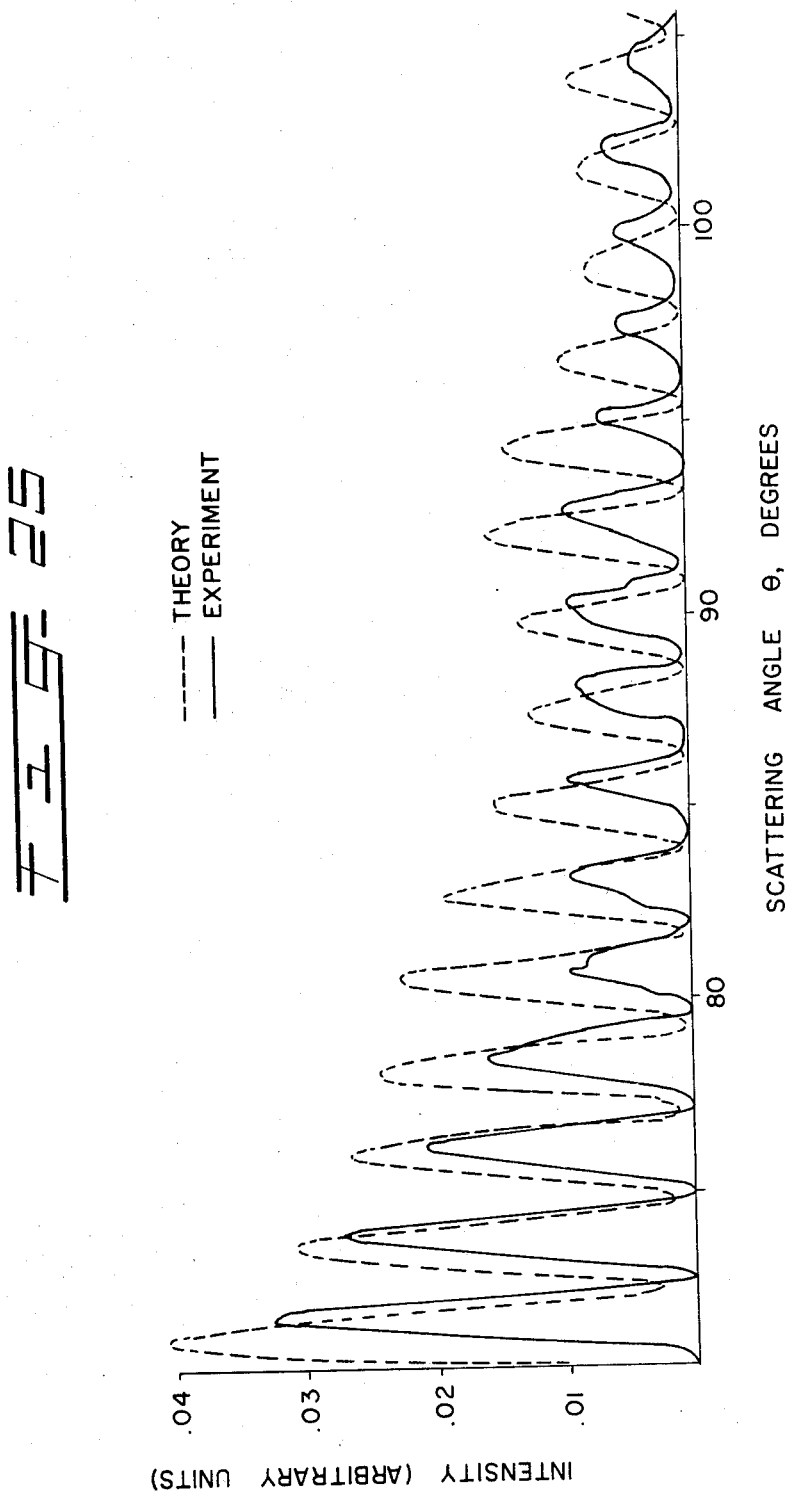
Figure 26:
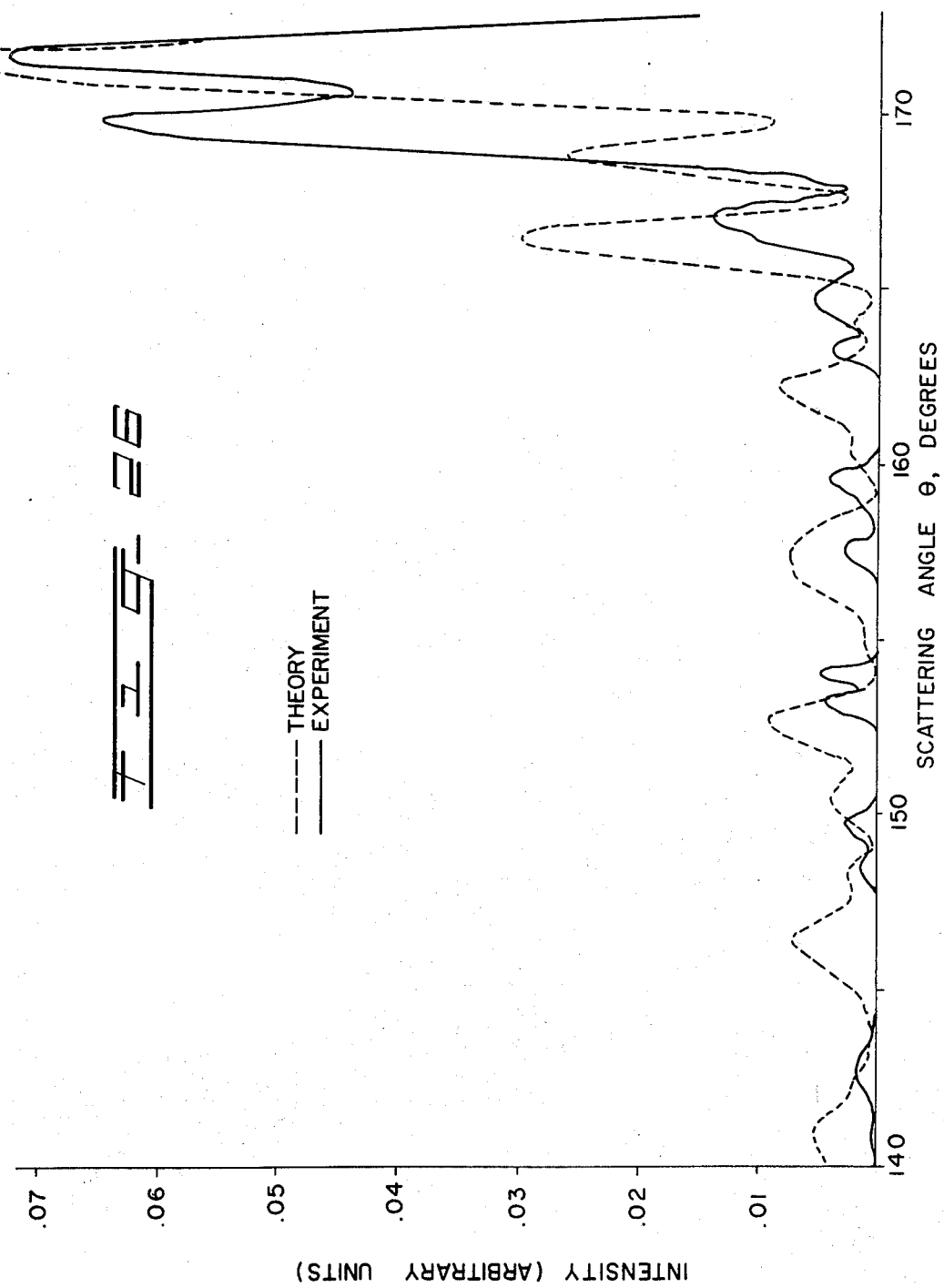

Perhaps, a more important characteristic is shown in FIG. 16. Here, the position of the fringe minima are plotted as a function of angle. Instead of starting at 0°, however, the fringe count is started at about 80.2° for reasons which will become apparent. What happens is that the position of the fringe minima, and the number of fringes as a function of angle, is constant between about 40° and 80°, regardless of variations in the core index. This effect can be derived from geometric ray theory, and is developed in a manner similar to the way the theory was developed for the unclad fiber. Referring to FIG. 17, by the application of Snell's Law, the following relationships are obtained between the incidence and refraction angles for the core-cladding interfaces of the fiber.

$$\sin \alpha = m_1 \sin \beta \tag{21}$$

and $$m_1 \sin \gamma = m_2 \sin \delta \tag{22}$$

where $m_1$ is the refractive index of the cladding, $m_2$ is the refractive index of the core, and $\alpha, \beta, \gamma$ and $\delta$ are the angles shown in FIG. 17. In addition, the following relationship exists between the angles $\alpha, \beta, \gamma$ and $\delta$:

$$\theta/2 + \delta = \alpha - \beta + \gamma \tag{23}$$

where $\theta$ is the scattering angle.

Finally, a relation between the angles $\beta$ and $\gamma$ and the core and fiber radii $a, b$, respectively, also exists, and is given by the equation:

$$b \sin \beta = a \sin \gamma \tag{24}$$

the optical path length of the ray in the core $p_2$ is given by:

$$p_2 = 2 m_2 a \cos \delta \tag{25}$$

and the optical path length in the cladding $p_1$ is:

$$p_1 = 2 \cdot m_1 \cdot (b \cos \beta - a \cos \gamma) \tag{26}$$

Thus, the total optical path length of the refracted ray is given by the equation:

$$p = 2[m_2 a \cos \delta + m_1(b \cos \beta - \theta a \cos \gamma)] - \lambda/4 \tag{27}$$

where once again the $\pi/2$ phase shift has been included because the ray passes through a focal line. The optical path of the reflected ray to the same relative position is $2u$, where:

$$2u = 2(b \cos \alpha - b \sin \theta/2 + \lambda 2).$$

Thus, the optical path difference $\Delta$ between the reflected and refracted rays is given by:

ti $\Delta = p = 2u$ $2[m_2 a \cos \delta + m (b \cos \beta - 0\ a \cos \gamma);$
$b \sin \theta/2] + \lambda/4 \cdot$ (29)

When $\gamma$ becomes greater than $\pi/2$, the ray misses the core and in that case Equation (18) must be used for $\Delta$. The condition for $\gamma < \pi/2$ is given by:

$$b/am_1 \sin \alpha < 1, \qquad (30)$$

where the value for $\alpha$ in Equation (14) can be used, just to determine the limit of inequality. The result is that for small scattering angles, such as shown in FIG. 17, (which also means small incidence angels, $\alpha$, for the refracted ray), the path difference between the refracted and reflected ray is given by:

$$\Delta(\theta) = 2\ [m_2 a \cos \delta + m_1(b \cos \beta - a \cos \gamma) - b \cos \alpha + b \sin \theta/2] + \lambda/4 \qquad (31)$$

where $\lambda$ is the wavelength of the incident beam. The number of fringes between $\theta_1$ and $\theta_2$ can then be written as:

$$N = [\Delta(\theta_1) - \Delta(\theta_2)] \cdot 1/\lambda \theta_1 > \theta_2 \cdot \qquad (31a)$$

Under this condition, i.e., where $\theta$ is small, the refracted ray passes through the core and so variations in core index and diameter change the position of the fringes.

As the scattering angle is increased there comes an angle for which the refracted ray no longer goes through the core, only through the cladding. This critical angle $\theta_C$ may be calculated from the relationship:

$$b/am_1 \sin \alpha \geq 1 \qquad (32)$$

where $\alpha$ is the fiber incidence angle as given in Equation (14).

After this point, Equation (18) may be used to calculate the fringe positions and so the fringe position becomes independent of core parameters. As can be seen from Equation (32), this large angle region, where the scattering pattern fringe position is independent of core index (or size) only exists for medium and small core diameters. In fact, the core diameter, $a$, must be less than:

$$a < b/m_1 \qquad (33)$$

for it to exist. For example, if the fiber has an index $m_1 = 1.5$, the core-to-fiber diameter ratio must be less than 0.67.

This result is very important because it means that for fibers with moderate core/cladding ratios, measurements of the scattering pattern fringe positions at large angles (between approximately 50°–90°) may be used to obtain the total fiber diameter, independent of the fiber core diameter and index, provided that the index of the cladding layer is known.

Figure 18:
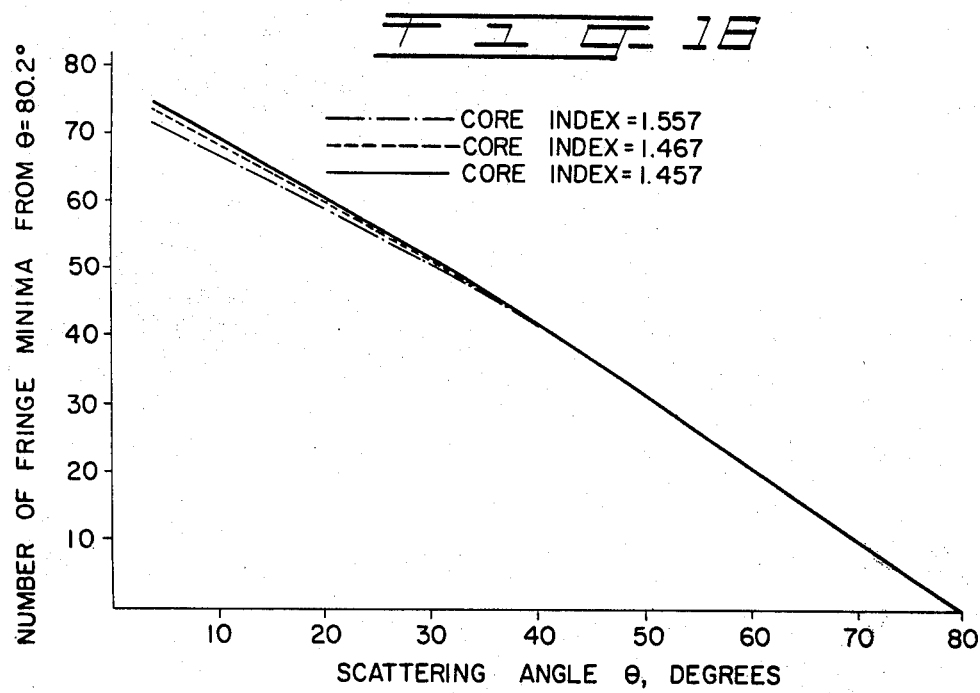
FIG. 18 is a graph similar to FIG. 16, but for a different angle range.

FIG. 18 is an expansion of the lower angle portion of FIG. 16 and shows in greater detail the variation of fringe position with differing core indices. It will be recalled that the angle range shown in FIG. 18 is less than the critical angle $\theta_C$. These graphs will also change with variations in core diameter. The results indicate that measurements which are made on the fringe positions at low scattering angles will permit either the core diameter or core index to be found, knowing the other. This measurement technique appears most attractive for core/cladding index differences of greater than 0.01, and it will work with differences as high as 0.1 or more. As shown in FIG. 18, a quartz fiber having a 20$\mu$m core whose index was 0.1 greater than the cladding layer yielded one fringe movement at the 10° angle. Thus, the number of fringes must be measured to an accuracy of much less than one fringe in order to give accurate core diameter measurements, but this is no problem. Assume that the core diameter is known, or has been measured by one of the other techniques disclosed herein, but that the core index is not known. The number of fringes occurring between two specific scattering angles $\theta_1$ and $\theta_2$, when both $\theta_1 < \theta_C$ and $\theta_2 < \theta_C$ is measured. Then the core index is calculated from Equations (31) and (31a). On the other hand, if the core index is known but the core diameter is not, then this diameter can be determined using Equations (31) and (31a). Alternatively, either quantity can be determined by finding the scattering angle corresponding to a particular difference in fringe number, as compared to the unclad fiber, and then calculating the core diameter or index difference from Equation (31), where:

$$\Delta(\theta) = f \times \lambda,$$

and $f$ equals the difference in fringe number.

As in the case of the unclad fiber, geometric theory predicts a cut-off angle $\theta_F$ and its value may be obtained from Equation (20) if Equation (33) holds, or otherwise it can be derived from Equations (29) and (30). As was the case for the unclad fiber, there is no threshold cut-off for the calculated patterns shown in FIG. 16 and so this cannot be used to measure fiber refractive index accurately.

Consider now forward scattering over the range $\theta = 0° = 7°$, which angle range is very similar to the 0° = 7° range used for the unclad fiber. The pattern observed is the combined effect of the interference fringes from refracted and reflected light and the diffraction effects from light not intercepted by the fiber. At these low angles, rays transmitted through the fiber go through both core and cladding and so changes in both core and cladding parameters change the phase of this ray, and, thus, the structure of the scattering pattern.

FIGS. 19–22 show the best fit that was obtained between theory and experiment for a typical clad, glass fiber. The fiber was measured to have an outer diameter of 18.6 ± 0.5$\mu$m using an image-splitting eyepiece. The core index at a wavelength of 0.633$\mu$m was 1.616 and the cladding index was 1.518. The core diameter was estimated to be about 15$\mu$m using a scanning electron microscope. The theoretical plots in FIGS. 19–22 assumed a fiber having a diameter of 18.25$\mu$m and a core diameter of 13.8$\mu$m.

Since the core diameter of this experimental sample was so large, there exists no angle where the fringes are independent of core diameter. However, FIG. 16 does show that the fringes are progressively less sensitive to core diameter at larger angles. Therefore, matching was obtained by a "zeroing-in" process wherein a best match was first obtained at the larger angles by varying the fiber diameter. Next, the core diameter was varied to obtain the best match between the small angle patterns, and this process was repeated until the best fit was achieved. It should be noted that the theoretical and experimental scattering intensities shown were normalized so that they were equal at the 13° maximum, for convenience in plotting.

In FIGS. 19–22 the modulation of the intensities does not match very well at the larger angles, that is, larger than approximately 63°. By changing the core diameter to 14.3μm and the fiber diameter to 18.3μm, FIGS. 23–26 were obtained. Here, a much better match of the modulation intensities were obtained; however, the fringe positions do not agree quite so well, especially at the lower angles. This would seem to indicate an incorrect core diameter. It is not known why a better match could not be obtained under these circumstances, but a reasonable explanation might be the existence of small deviations from circularity in the fiber cross section. Also, it was not known how concentric the core was in this experimental fiber. Variations of only 0.1μm in fiber cross section and 0.5μm in concentricity would give the observed variations. It was necessary to calculate patterns to a precision of 0.1μm or better in fiber diameter and 0.5μm in core diameter to obtain a good match. This suggests that this kind of accuracy will be obtained by the fiber diameter measurement device to be described below, which device detects the scattering pattern fringe separations and positions.

FIGS. 23–26 indicate that there is a reasonable agreement between experiment and theory at very large scattering angles, that is, angles greater than approximately 170°, although not as good as was obtained at the lower angles. There were also more violent changes in structure between the theoretical plots of FIGS. 19–22, and FIGS. 23–26, although FIGS. 19–22 seem to match the experimental data more closely.

Figure 27:
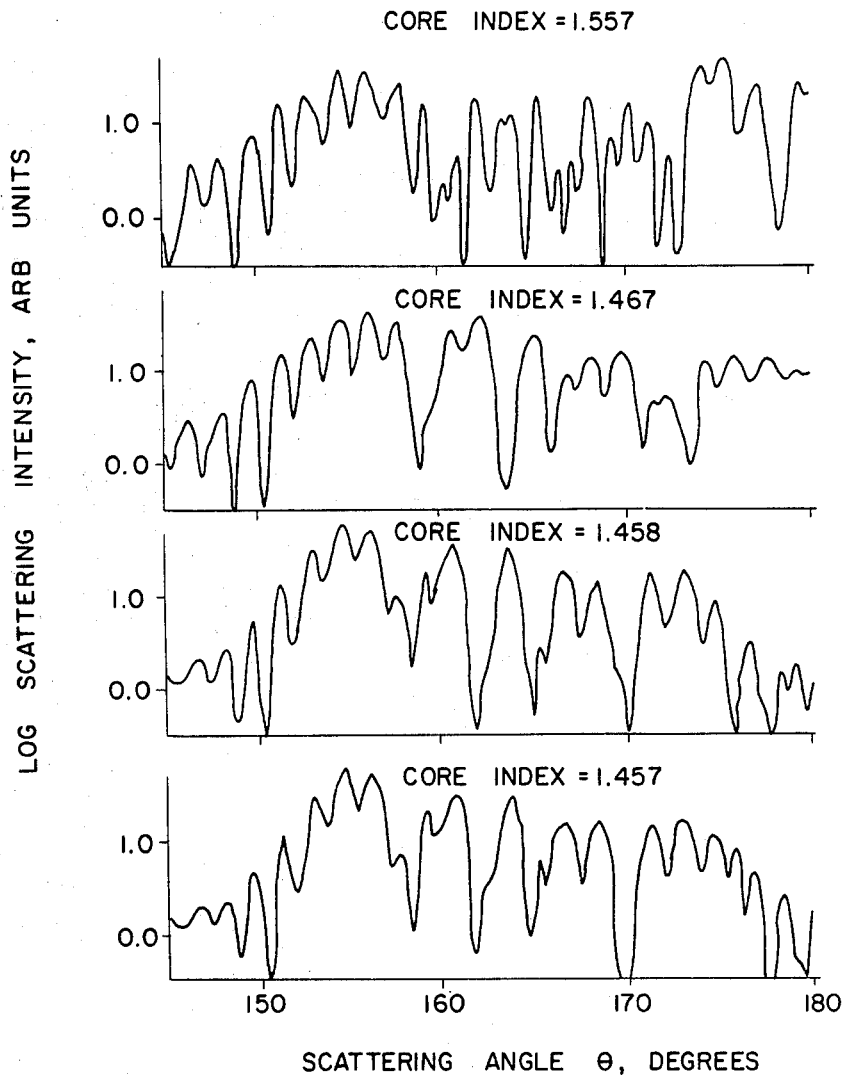
FIG. 27 is a graph showing the scattering pattern of a clad fiber for differing refractive indices.

FIG. 27 is the theoretical scattering pattern for the same 43.05μm fiber discussed earlier but plotted for scattering angles of 145° through 180°. The same four values of core index were used, namely, 1.457, 1.458, 1.467, and 1.557 with a 20μm diameter core. The cladding index was 1.457 so the bottom curve is for an unclad fiber. There were differences found in the structure of the patterns although there is the same cut-off edge at an angle of 151°, in all cases. There were changes evident even for a 0.001 index difference between core and cladding, showing that this part of the scattering pattern is more sensitive from 115° to 180°, than at the smaller scattering angles. The changes are greater, nearer to a 180° scattering angle, than at angles close to 150°.

Figure 28:
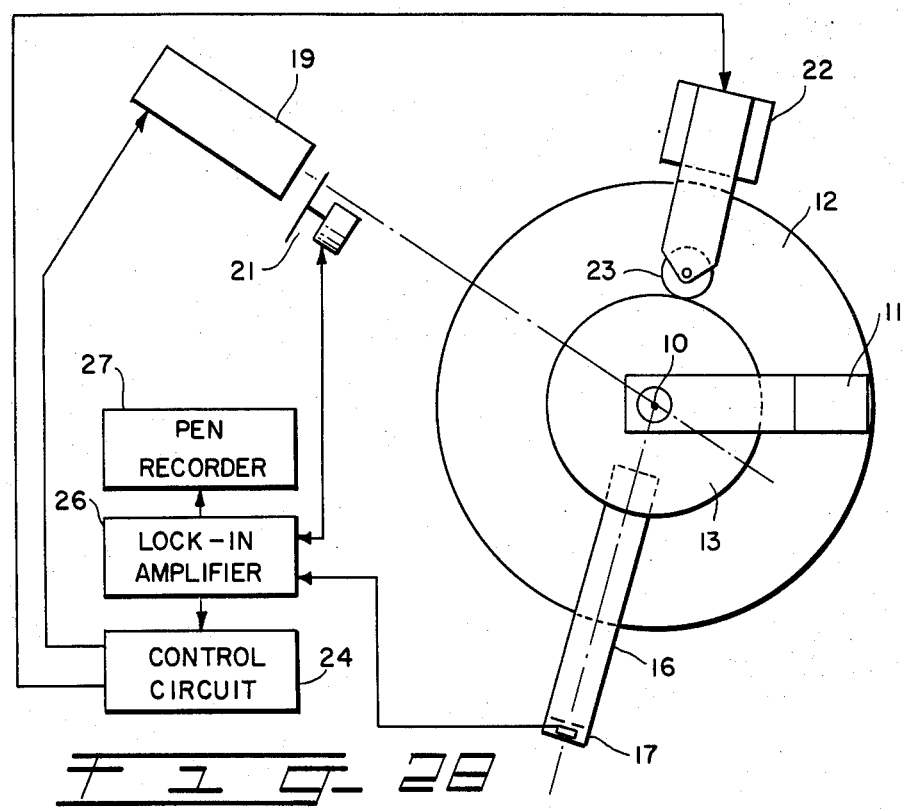
FIG. 28 depicts an illustrative apparatus for practicing the methods of this invention.

FIG. 28 depicts an illustrative apparatus which may be used to perform the measurements on fringe position and amplitude according to the invention. As shown, the fiber 10 to be measured is secured in some suitable holder 11 which is fastened to a spectrometer base 12. A rotatable table 13, coaxial with fiber 10 and base 12, mounts a spectrometer 16 having a slit detector 17 at one end thereof.

A radiant energy source 18, for example, a C. W. HeNe laser, directs a light beam 19 at the fiber 10. The output of the laser is chopped by a rotary chopper 21, as shown.

A synchronous motor 22 drives a wheel 23 which engages the rotatable table 13. A control circuit 24 drives motor 22 and receives the output of a lock-in amplifier 26 which in turn receives the output of slit detector 17 and also drives chopper 21. A pen recorder 27, or other suitable recording device, is also connected to the output of amplifier 26.

In operation, the laser 19 is energized by control circuit 24 and spectrometer 16 rotated to the 0° position. Next, motor 22 is energized to slowly rotate table 13 so that detector 17 views the entire scattering pattern after one complete revolution (360°) has been accomplished. The output of detector 17, synchronized with chopper 21, is displayed on recorder 27 and the recorded trace, of course, contains the amplitude and spatial information required to perform the methods of this invention.

Figure 29:
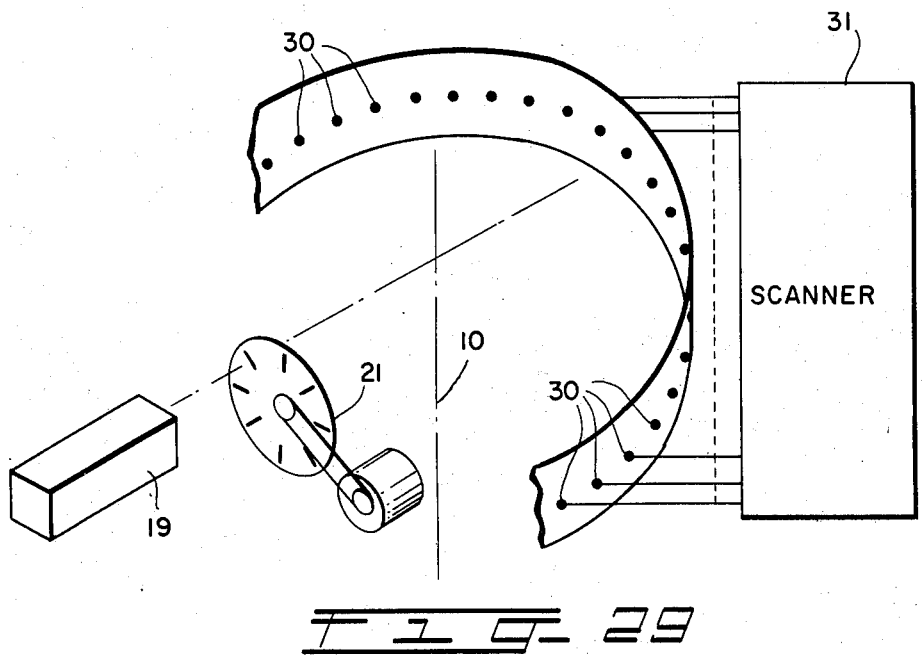
FIG. 29 depicts an alternative embodiment of the apparatus shown in FIG. 28.

If only a limited range of angles need be swept, control circuit 24 can be preset to start and to terminate the rotation of table 13 at the desired angles. In an on-line process, the output of amplifier 26 would be connected to suitable logic circuitry such that if the parameter being measured, for example fiber diameter, 1xceeded or fell below some priorly established tolerance limit, a feedback loop could make appropriate changes to the process. Thus, fiber diameter, or any other important parameter, could be maintained to an extremely fine tolerance. In this latter event, a rotating spectrometer would probably be inconvenient so, as shown in FIG. 29, a circular array of photoelectric devices 30, for example photodiodes, and a scanner 31 would be substituted for spectrometer 16, motor 22, etc., in FIG. 1.

The preferred radiant energy source is, of course, a laser. However, other monochromatic, coherent sources, such as a pinhole and a mercury vapor lamp, may also be employed.

One skilled in the art may make various changes and substitutions to the arrangement of parts shown without departing from the spirit and scope of the invention.

What is claimed is:

1. A method of measuring the diameter, $D_C$, of the core of a clad optical fiber, given the thickness of the cladding layer, $t$, and the refractive indices of the cladding and core, $m_1$ and $m_2$, respectively, which comprises:

directing a beam of spatially coherent, monochromatic radiation at said fiber thereby to generate a complex scattering pattern, at least a portion of said pattern including contributions from the diffraction, the reflection and the refraction of said beam by said fiber, said scattering pattern being spatially radially disposed about said fiber and having a fringe pattern intensity modulation superimposed thereon;

at a given reference angle $\theta_R$, measuring the modulation pattern over a scattering angle range $\Delta\theta_R$, where $\theta_R$ satisfies the relationship:

$$\theta_R \times \tfrac{1}{2}\Delta\theta_R < \theta_F$$

and $\theta_F$ is the cut-off angle which satisfies the relation:

$$m_1 \cos(\theta_F/2) = 1;$$

determining the core-to-fiber diameter ratio, R, by comparing said measured modulation pattern with modulation patterns priorly observed for clad optical fibers of the same core and cladding indices, measured at the same scattering angle range $\Delta\theta_R$; and then computing said core diameter $D_C$ from the equation:

$$D_C = 2Rt/(1 - R).$$

2. The method according to claim 1 wherein said beam directing step comprises:

positioning a beam of spatially coherent, monochromatic radiation to impinge upon said filament perpendicular to the longitudinal axis thereof, said beam having an electric field vector which is parallel to said axis.

3. The method according to claim 1 wherein said beam directing step comprises:

positioning a beam of spatially coherent, monochromatic radiation to impinge upon said filament perpendicular to the longitudinal axis thereof, said beam having an electric field vector which is transverse to said axis.

4. A method of measuring the cladding thickness, $t$, of a clad optical fiber of known core diameter, $D_C$, and known cladding and core refractive indices $m_1$ and $m_2$, respectively, which comprises:

directing a beam of spatially coherent, monochromatic radiation at said fiber thereby to generate a complex scattering pattern, at least a portion of said pattern including contributions from the diffraction, the reflection and the refraction of said beam by said fiber, said scattering pattern being spatially radially disposed about said fiber and having a fringe pattern intensity modulation superimposed thereon;

at a given reference angle $\theta_R$, measuring the modulation pattern over a scattering angle range $\Delta\theta_R$, where $\theta_R$ satisfies the relationship:

$$\theta_R + \tfrac{1}{2}\Delta\theta_R < \theta_F$$

where, $\theta_F$, the fring cut-off angle satisfies the relation:

$$m_1 \cos(\theta_F/2) = 1;$$

determining the core-to-fiber diameter ratio, R, by comparing said measured modulation pattern with modulation patterns priorly observed for clad optical fibers of the same core and cladding indices, measured at the same scattering angle range $\Delta\theta_R$; and then computing said cladding thickness $t$ from the equation:
$$t = D_C(1 - R)/2R.$$

5. The method according to claim 4 wherein said beam directing step comprises:

positioning a beam of spatially coherent, monochromatic radiation to impinge upon said filament perpendicular to the longitudinal axis thereof, said beam having an electric field vector which is parallel to said axis.

6. The method according to claim 4 wherein said beam directing step comprises:

positioning a beam of spatially coherent, monochromatic radiation to impinge upon said filament perpendicular to the longitudinal axis thereof, said beam having an electric field vector which is transverse to said axis.

7. A method of measuring the degree of noncircularity in a transparent filament, comprising the steps of:

a. directing a beam of spatially coherent, monochromatic radiation at said filament thereby to generate a complex scattering pattern, at least a portion of said pattern including contributions from the diffraction, the reflection, and the refraction of said beam by said filament, said scattering pattern being spatially radially disposed about said filament;

b. at a given scattering angle $\theta_R$, counting the number of fringes $N_1$ which occur in said pattern over the range $\Delta\theta_R$ which range is centered on said given scattering angle, said scattering angle satisfying the relation:

$$\theta_R + \tfrac{1}{2}\Delta\theta_R < \theta_F$$

where, $\theta_F$, the fringe cut-off angle satisfies the inequality:

$$m_1 \cos(\theta_F/2) \geq 1.$$

and $m_1$ is a refractive index of the filament;

c. repeating step (b) for the given scattering angle $-\theta_R$, thereby counting the number of fringes $N_2$;

d. computing the difference between $N_1$ and $N_2$; and then e. determining the degree of non-circularity by comparing said difference with corresponding fringe number differences from priorly measured filaments of the same mean diameter and refractive index.

8. A method of measuring the deviation from concentricity of the core of a clad optical fiber of known outer diameter and known core and clad refractive indices, comprising the steps of:

directing a beam of spatially coherent, monochromatic radiation at said fiber thereby to generate a complex scattering pattern, at least a portion of said pattern including contributions from the diffraction, the reflection, and the refraction of said beam by said fiber, said scattering pattern being spatially radially disposed about said fiber, said pattern having a fringe modulation imposed thereon;

measuring $\theta_1$ and $\theta_2$, the lowest angles at which said modulation first appears in said fringe pattern, where $\theta_1 < 0 < \theta_2$; and determining the deviation from concentricity by comparing $\theta_1$ and $\theta_2$ with corresponding angles priorly measured for similar clad fibers of known diameter and concentricity and known core and cladding refractive indices.

* * * * *

UNITED STATES PATENT OFFICE
CERTIFICATE OF CORRECTION

Patent No. 4,067,651   Dated January 10, 1978

Inventor(s) Laurence Shrapnell Watkins

It is certified that error appears in the above-identified patent and that said Letters Patent are hereby corrected as shown below:

Column 1, line 12, "fibers, the like." should read -- fibers, and the like. --; line 57, "fiber Firstly," should read -- fiber. Firstly, --. Column 3, line 13, "of unclad" should read -- of an unclad --; line 24, "light as" should read -- light is --. Column 4, line 44, "Socity" should read -- Society --; lines 52 and 53, "polarization:" should read -- polarizations: --. Column 9, line 10, "$\Theta_R \pm 1/2 \Delta \Theta_R < \Theta_F.$" should read -- $\Theta_R + 1/2 \Delta \Theta_R < \Theta_F$. --. Column 10, line 52, "40 μ" should read -- 40 μm --. Column 12, line 18, "In FIG.," should read -- In FIG. 13, --; line 67, equation 27, that portion of the equation reading "(b cos β - 0 a cos γ)]" should read -- (b cos β - a cos γ)] --. Column 15, line 13, "were obtained" should read -- was obtained --. Column 16, line 18, "1xceeded" should read -- exceeded --; Claim 1, line 54, "$\Theta_R \times 1/2 \Delta\Theta_r < \Theta_F$" should read -- $\Theta_R + 1/2 \Delta\Theta_R < \Theta_F$ --.

UNITED STATES PATENT OFFICE
CERTIFICATE OF CORRECTION

Patent No. 4,067,651          Dated January 10, 1978

Inventor(s) Laurence Shrapnell Watkins

It is certified that error appears in the above-identified patent and that said Letters Patent are hereby corrected as shown below:

Column 18, Claim 7, line 24, "$m_1 \cos(\Theta_F/2) \geq 1.$" should read

-- $m_1 \cos(\Theta_R/2) \geq 1$, --.

Columns 5, 6, 7, 8, 13 & 14 should be deleted and substituted with the attached Columns 5, 6, 7, 8, 13 & 14 therefore.

Signed and Sealed this

Twenty-second Day of August 1978

[SEAL]

Attest:

RUTH C. MASON
Attesting Officer

DONALD W. BANNER
Commissioner of Patents and Trademarks sel function of the first kind, $H_n$ is the Hankel function of the second kind and $b_n^0$, $B_n^1$, $b_n^1$, $B_n^2$ are complex coefficients.

In Equation (1) the first term represents the incident wave and the second term the scattered wave. The incident wave is a plane wave expressed in the form $$\psi = e^{i\omega t - ikx} = \sum_{n = -\infty}^{\infty} F_n J_n(kr) \qquad (4)$$

where $$F_n = (-1)^n e^{in\theta + i\omega t}.$$

The complex coefficient $b_n^0$ is found by using the boundary conditions that mu and $m\delta u/\delta_r$ are to be continuous at the core/cladding and cladding/air interfaces. This leads to a set of four equations from which the coefficient is found:

$$b_n^o = \frac{\begin{vmatrix} J_n(\alpha_1) & H_n(m_1\alpha_1) & J_n(m_1\alpha_1) & 0 \\ J_n'(\alpha_1) & m_1 H_n'(m_1\alpha_1) & m_1 J_n'(m_1\alpha_1) & 0 \\ 0 & H_n(m_1\alpha_2) & J_n(m_1\alpha_2) & J_n(m_2\alpha_2) \\ 0 & m_1 H_n'(m_1\alpha_2) & m_1 J_n'(m_1\alpha_2) & m_2 J_n'(m_2\alpha_2) \end{vmatrix}}{\begin{vmatrix} H_n(\alpha_1) & H_n(m_1\alpha_1) & J_n(m_1\alpha_1) & 0 \\ H_n'(\alpha_1) & m_1 H_n'(m_1\alpha_1) & m_1 J_n'(m_1\alpha_1) & 0 \\ 0 & H_n(m_1\alpha_2) & J_n(m_1\alpha_2) & J_n(m_2\alpha_2) \\ 0 & m_1 H_n'(m_1\alpha_2) & m_1 J_n'(m_1\alpha_2) & m_2 J_n'(m_2\alpha_2) \end{vmatrix}} \qquad (5)$$

where $\alpha_1 = kb$ and $\alpha_2 = ka$.

The scattered light intensity is given by the second term in Equation (1). Since the scattered light is to be observed at some distance from the fiber, the asymptotic expression for $H_n(kr)$ can be used. The intensity for the scattered light is thus $I_p$ $$I_p = \left| \frac{2}{\pi kr} e^{(-ikr + i\omega t - i3\pi/4)} \sum_{n = -\infty}^{\infty} b^o{}_n e^{in\theta} \right|^2 \qquad (6)$$

$$= \frac{\lambda}{\pi^2 r} \left| b^o{}_0 + 2 \sum_{n=1}^{\infty} b^o{}_n \cos(n\theta) \right|^2,$$

since $b^o{}_{-n} = b^o{}_n$.

Similar results can be found for the light scattered when the incident radiation is polarized perpendicular to fiber axis, but these are not given here for brevity.

Of course, Equation (6) may be solved manually, but in view of the large number of points which must be plotted to obtain a useful scattering pattern, a manual solution is tedious. Accordingly, I found it preferable to employ a computer to perform the repetitive calculations necessary to solve Equation (6).

FIG. 2 shows the flow diagram which I employed to calculate the scattering intensity from Equation (6). It must be emphasized that this flow chart is trivial and forms no part of the invention; neither does the computer program which was written to implement this flow chart, which program is entirely routine, and well within the skill of any competent programmer.

Some interesting scaling problems were experienced in solving Equation (6) in this manner, and these will now be discussed, for the sake of completeness. In practice, the terms in Equation (6) tend to become zero for large values of $n$. It was found that in order to achieve this result, which greatly simplifies the mathematics, the number of terms, $n$, had to be greater than 40 for small diameter fibers and greater than $1.2\, m_1 b 2\pi/\lambda$ for larger diameter fibers. This conclusion was checked by simply calculating the contribution made to the diffraction pattern by the last 10 percent of the terms in Equation (6) and then keeping this contribution at a figure of less than $10^{-7}$. The J Bessel functions were then calculated using the downward recursion formula:

$$\gamma J_{l-1}(\alpha) = 2n\gamma/\alpha\, J_l(\alpha) - \gamma J_{l+1}(\alpha). \qquad (7)$$

An arbitrarily small value of $10^{-30}$ was used for $\gamma Jl$ and $l$ was made sufficiently large, by trial and error, until repeatable results were obtained. For small arguments ($\alpha < 100$), $l$ was made $2.8\,n + 11$, as suggested by Lundberg. For large $\alpha$, $l$ was stated at $1.2\,n$. After recurring down to $\gamma J_0$, to proportional constant $\gamma$ was found from the sum:

$$J_0(\alpha) + 2 \sum_{p = 1}^{\infty} J_{2p}(\alpha) = 1. \qquad (8)$$

The values of $J_0$ up to an argument $\alpha = 50$ were confirmed by checking them against results published in standard Bessel Function Tables. For large values of $l$ it was found that during recurrence, $\gamma J$ attained very large values exceeding the range of the computer. I, thus, found it necessary to use a scaling factor to keep the values within range. It was necessary to keep track of this scaling factor since the values of J for large $l$ might contribute a significant amount to the later computations even though their values were exceedingly small.

Finally, the values of J were returned to the main program in logarithmic form. This was found to be the easiest way to handle the large range of numbers. The sign was carried in a separate function.

The Hankel function $H_n$ is given by:

$$H_n = J_n - iY_n \qquad (9)$$

where $Y_n$ is the Bessel function of the second kind. $Y_o$ was calculated by the asymptotic expansion:

$$Y_o(\alpha) = \left(\frac{2}{\alpha\pi}\right)^{\frac{1}{2}} \left[ \sin\left(\alpha - \frac{\pi}{4}\right)\left(1 - \frac{(-1)(-9)}{2!(8\alpha)^2}\right.\right. \qquad (10)$$

$$\left. + \frac{(-1)(-9)(-25)(-49)}{4!(8\alpha)^4} - \cdots\right)$$

$$\left. + \cos\left(\alpha - \frac{\pi}{4}\right)\left(\left(\frac{-1}{8\alpha}\right) - \frac{(-1)(-9)(-25)}{3!(8\alpha)^3} + \cdots\right)\right].$$

Subsequent values of $Y_l$ were calculated using the Wronskian relation, which is reported to yield slightly more accurate results than are obtained by using upward recurrence. This relationship is:

$$J_l(\alpha) Y_{l+1}(\alpha) - J_{l+1}(\alpha) Y_l(\alpha) = 2/\alpha\pi. \qquad (11)$$

Derivatives for both J and Y were calculated from the equation:

$$C_l'(\alpha) = C_{l-1}(\alpha) - l/\alpha\, C_l(\alpha) \qquad (12)$$

Again, all the values were returned to the main program in logarithmic form since $Y_l$ attains very large values for large $l$.

The individual terms of the numerator and denominator determinants were also computed in logarithmic form. They were then converted to standard form with a common scaling factor and the determinants calculated. After the final division to obtain $b_n$ or $a_n$, the scaling was removed to give the final value. In this way, the coefficients were calculated without exceeding the range of the computer or losing terms which contribute significantly to the final result, even though their values at a particular point were very small.

Finally, the scattering functions were calculated using Equation (6). It is interesting to note that to calculate 256 points for a clad optical fiber of 160μ diameter took only 30 minutes on an IBM 360/50 computer, using double precision, which amply justifies the time taken to write the necessary computer program.

By using an arbitrary core size ranging from zero to the total fiber size and by making the refractive index of the core equal to the refractive index of the cladding layer, the program employed also gave results for unclad fibers. This relationship was employed to check the validity and operation of the computer program used. For example, if the core size is varied, no variation in the scattering pattern should occur. Secondly, the results of any computer run may be compared with those published by others, for example Lundberg.

FIG. 3 shows a plot of Lundberg's calculated results for an unclad fiber together with comparable results from the program I employed superimposed thereon. This graph confirms that the program yields the correct results for fiber sizes of about 30μ. It was also found that varying the core size in no way affect the results at all provided that the refractive indices of the core and cladding were maintained at the same value.

In accordance with the invention, I have discovered that there are two distinct regions of significance in the scattering pattern shown in FIG. 3. I have further discovered that these two regions may advantageously be employed in the performance of certain of the measurements to be discussed below.

As shown in FIG. 3, beyond about 7°, the scattering pattern varies in intensity in a sinusoidal fashion as a function of the scattering angle. The period of this variation is relatively constant and, as will be seen later, is inversely related to the fiber diameter.

The behavior of this fringe pattern can be explained in a simple geometric manner by referring to FIG. 4. As shown, there are two paths by which light rays can be bent to a direction $\theta$ from the axis. One path is by reflection from the surface of the fiber, the other is by refraction through the fiber. Interference between these rays, whose path lengths vary with changes in the value of $\theta$, causes the observed fringe pattern. The derivation of the equation which gives the path difference $\Delta$ between the reflected and refracted beams for an unclad fiber is set forth below.

Referring again to FIG. 4, by tracing rays along the wave normals in a beam, it is possible to calculate the path lengths of the waves. The object, therefore, is to trace two rays that both leave the fiber at an angle $\theta$, one of which is refracted through the fiber and the other of which is reflected from it, as shown in FIG. 4. Since these two rays both leave the fiber at an angle $\theta$ in the far field there will be interference between the two waves reresented by these rays. This geometric ray approach has some limitations, two of which must be considered here. As taught by VanDerHulst, one limitation is that the fiber must be large compared to the wavelength of the light. The second is that if rays converge to a focus, a region of infinite energy is produced. Here the geometric approach breaks down, since the waves in this focal region are no longer normal to the geometric rays. VanDerHulst states that if the rays pass through a focal line, such as F, in FIG. 4, then the phase of that ray must be advanced by $\pi/2$ radians, which is equivalent to shortening the path length by a quarter wave ($\lambda/4$).

The ray incidence angle $\alpha$ is given by Snell's law for a particular scattering angle $\theta$, by the equation:

$$\sin \alpha = m \sin(\alpha - \theta/2) \tag{13}$$

where $m$ is the index of refraction. This can be rewritten in the following way, which will be more convenient for use in later calculations.

$$\sin \alpha = \frac{m \cos \alpha \sin \frac{\theta}{2}}{m \cos \frac{\theta}{2} - 1} \tag{14}$$

The optical path length of the refracted ray may now be calculated and is given by p, where $$p = 2 mb \cos(\alpha - \theta/2) \tag{15}$$

where $b$ is the fiber radius. Since this ray is the one passing through a focal line, its length must be reduced by a quarter wave, therefore, $$p = 2 mb \cos(\alpha - \theta/2) - \lambda/4 \tag{16}$$

where $\lambda$ is the wavelength of the light. The optical path of the reflected ray to the same relative positions is 2u, where $$u = b \cos \alpha - b \sin \theta/2 + \lambda/2 \tag{17}$$

Thus, the optical path difference, $\Delta$, between the reflected and refracted ray is given by:

$$\Delta = p - 2u = 2[m b \cos(\alpha - \theta/2) - b \cos \alpha + b \sin \theta/2] + \lambda/4$$
$$= 2b [\sin \theta/2 + \sqrt{m^2 + 1 - 2m \cos \theta/2}] + \lambda/4 \tag{18}$$

where, $$\tan \alpha = \frac{m \sin \frac{\theta}{2}}{(m \cos \frac{\theta}{2} - 1)} \tag{19}$$

$\theta$ is the forward scattering angle, $m$ is the refractive index and $b$ the fiber radius.

In Equation (18), the phase difference, $\Delta$, is seen to be proportional to $b$, the fiber radius. Thus, at a given scattering angle $\theta$, the fringe spacing over a small angle range $\Delta\theta$ is inversely proportional to the fiber diameter, so the fringes will be closer together as the fibers get larger. This, of course, is the basis of my invention for measuring fiber diameter. That is to say, at a given reference scattering angle $\theta_R$, counting the number of fringes which occur within the angle range $\Delta\theta_R$, centered about $\theta_R$, and then solving Equation (18) for $b$. Of course, as used throughout this specification, and in the claims, the expression "counting the number of fringes" includes counting fractional parts thereof and is not restricted to integer number of fringes.

Now, angle $\alpha$ is the incidence angle of the refracted ray. This has a maximum value of $\pi/2$ which establishes an upper limit on the validity of this formula with respect to the scattering angle $\theta$. The condition is:

$$m \cos \theta/2 \geq 1. \tag{20}$$

where once again the $\pi/2$ phase shift has been included because the ray passes through a focal line. The optical path of the reflected ray to the same relative position is 2u, where:

$$2u = 2(b \cos \alpha - b \sin \theta/2 + \lambda 2).$$

Thus, the optical path difference $\Delta$ between the reflected and refracted rays is given by:

$$\Delta = p - 2u = 2[m_2 a \cos \delta + m (b \cos \beta - a \cos \gamma); - b \cos \alpha + b \sin \theta/2] + \lambda/4. \quad (29)$$

When $\gamma$ becomes greater than $\pi/2$, the ray misses the core and in that case Equation (18) must be used for $\Delta$. The condition for $\gamma < \pi/2$ is given by:

$$b/am_1 \sin \alpha < 1, \quad (30)$$

where the value for $\alpha$ in Equation (14) can be used, just to determine the limit of inequality. The result is that for small scattering angles, such as shown in FIG. 17, (which also means small incidence angels, $\alpha$, for the refracted ray), the path difference between the refracted and reflected ray is given by:

$$\Delta(\theta) = 2 [m_2 a \cos \delta + m_1(b \cos \beta - a \cos \gamma) - b \cos \alpha + b \sin \theta/2] + \lambda/4 \quad (31)$$

where $\lambda$ is the wavelength of the incident beam. The number of fringes between $\theta_1$ and $\theta_2$ can then be written as:

$$N = [\Delta(\theta_1) - \Delta(\theta_2)] \cdot 1/\lambda \theta_1 > \theta_2. \quad (31a)$$

Under this condition, i.e., where $\theta$ is small, the refracted ray passes through the core and so variations in core index and diameter change the position of the fringes.

As the scattering angle is increased there comes an angle for which the refracted ray no longer goes through the core, only through the cladding. This critical angle $\theta_C$ may be calculated from the relationship:

$$b/am_1 \sin \alpha \geq 1 \quad (32)$$

where $\alpha$ is the fiber incidence angle as given in Equation (14).

After this point, Equation (18) may be used to calculate the fringe positions and so the fringe position becomes independent of core parameters. As can be seen from Equation (32), this large angle region, where the scattering pattern fringe position is independent of core index (or size) only exists for medium and small core diameters. In fact, the core diameter, $a$, must be less than:

$$a < b/m_1 \quad (33)$$

for it to exist. For example, if the fiber has an index $m_1 = 1.5$, the core-to-fiber diameter ratio must be less than 0.67.

This result is very important because it means that for fibers with moderate core/cladding ratios, measurements of the scattering pattern fringe positions at large angles (between approximately 50°-90°) may be used to obtain the total fiber diameter, independent of the fiber core diameter and index, provided that the index of the cladding layer is known.

FIG. 18 is an expansion of the lower angle portion of FIG. 16 and shows in greater detail the variation of fringe position with differing core indices. It will be recalled that the angle range shown in FIG. 18 is less than the critical angle $\theta_C$. These graphs will also change with variations in core diameter. The results indicate that measurements which are made on the fringe positions at low scattering angles will permit either the core diameter or core index to be found, knowing the other. This measurement technique appears most attractive for core/cladding index differences of greater than 0.01, and it will work with differences as high as 0.1 or more. As shown in FIG. 18, a quartz fiber having a 20μm core whose index was 0.1 greater than the cladding layer yielded one fringe movement at the 10° angle. Thus, the number of fringes must be measured to an accuracy of much less than one fringe in order to give accurate core diameter measurements, but this is no problem. Assume that the core diameter is known, or has been measured by one of the other techniques disclosed herein, but that the core index is not known. The number of fringes occurring between two specific scattering angles $\theta_1$ and $\theta_2$, where both $\theta_1 < \theta_C$ and $\theta_2 < \theta_C$ is measured. Then the core index is calculated from Equations (31) and (31a). On the other hand, if the core index is known but the core diameter is not, then this diameter can be determined using Equations (31) and (31a). Alternatively, either quantity can be determined by finding the scattering angle corresponding to a particular difference in fringe number, as compared to the unclad fiber, and then calculating the core diameter or index difference from Equation (31), where:

$$\Delta(\theta) = f \times \lambda,$$

and $f$ equals the difference in fringe number.

As in the case of the unclad fiber, geometric theory predicts a cut-off angle $\theta_F$ and its value may be obtained from Equation (20) if Equation (33) holds, or otherwise it can be derived from Equations (29) and (30). As was the case for the unclad fiber, there is no threshold cut-off for the calculated patterns shown in FIG. 16 and so this cannot be used to measure fiber refractive index accurately.

Consider now forward scattering over the range $\theta = 0° - 7°$, which angle range is very similar to the 0° — 7° range used for the unclad fiber. The pattern observed is the combined effect of the interference fringes from refracted and reflected light and the diffraction effects from light not intercepted by the fiber. At these low angles, rays transmitted through the fiber go through both core and cladding and so changes in both core and cladding parameters change the phase of this ray and, thus, the structure of the scattering pattern.

FIGS. 19-22 show the best fit that was obtained between theory and experiment for a typical clad, glass fiber. The fiber was measured to have an outer diameter of 18.6 ± 0.5μm using an image-splitting eyepiece. The core index at a wavelength of 0.633μm was 1.616 and the cladding index was 1.518. The core diameter was estimated to be about 15μm using a scanning electron microscope. The theoretical plots in FIGS. 19-22 assumed a fiber having a diameter of 18.25μm and a core diameter of 13.8μm.

Since the core diameter of this experimental sample was so large, there exists no angle where the fringes are independent of core diameter. However, FIG. 16 does show that the fringes are progressively less sensitive to core diameter at larger angles. Therefore, matching was obtained by a "zeroing-in" process wherein a best match was first obtained at the larger angles by varying